US 12,422,666 B2

(12) United States Patent
Sonoda et al.

(10) Patent No.: US 12,422,666 B2
(45) Date of Patent: Sep. 23, 2025

(54) OPTICAL SCANNING DEVICE, DRIVING METHOD OF OPTICAL SCANNING DEVICE, AND IMAGE DRAWING SYSTEM

(71) Applicant: FUJIFILM Corporation, Tokyo (JP)

(72) Inventors: Shinichiro Sonoda, Kanagawa (JP); Hirotoshi Yoshizawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 446 days.

(21) Appl. No.: 18/180,273

(22) Filed: Mar. 8, 2023

(65) Prior Publication Data

US 2023/0305293 A1 Sep. 28, 2023

(30) Foreign Application Priority Data

Mar. 25, 2022 (JP) ................. 2022-050810

(51) Int. Cl.
G02B 26/08 (2006.01)
G02B 26/10 (2006.01)

(52) U.S. Cl.
CPC ....... *G02B 26/0858* (2013.01); *G02B 26/101* (2013.01)

(58) Field of Classification Search
CPC .... G02B 26/08; G02B 26/10; G02B 26/0858; G02B 26/101
See application file for complete search history.

(56) References Cited

U.S. PATENT DOCUMENTS

2011/0101202 A1 5/2011 Mizutani
2022/0404613 A1* 12/2022 Yoshizawa ........... G02B 26/101
2023/0176361 A1 6/2023 Hishinuma et al.

FOREIGN PATENT DOCUMENTS

EP         4 105 709 A1    12/2022
JP         2016-184018 A   10/2016
WO     WO 2022/025012 A1   2/2022

OTHER PUBLICATIONS

European Communication pursuant to Article 94(3) EPC for European Application No. 23 158 418.6, dated May 30, 2025.
Extended European Search Report for European Application No. 23158418.6, dated Aug. 17, 2023.

* cited by examiner

*Primary Examiner* — Euncha P Cherry
(74) *Attorney, Agent, or Firm* — Birch, Stewart, Kolasch & Birch, LLP

(57) ABSTRACT

A driving controller derives a first integrated value by integrating a first phase delay time of an output signal of a first angle detection sensor with respect to a first signal to be referred to corresponding to a first driving signal, the number of times that is greater by a factor of a natural number than the number of times corresponding to a period of time of one frame of a motion image to be drawn, and derives a second integrated value by integrating a second phase delay time of an output signal of a second angle detection sensor with respect to a second signal to be referred to corresponding to a second driving signal, the number of times that is greater by a factor of a natural number than the number of times corresponding to the period of time of one frame.

7 Claims, 16 Drawing Sheets

FIG. 7
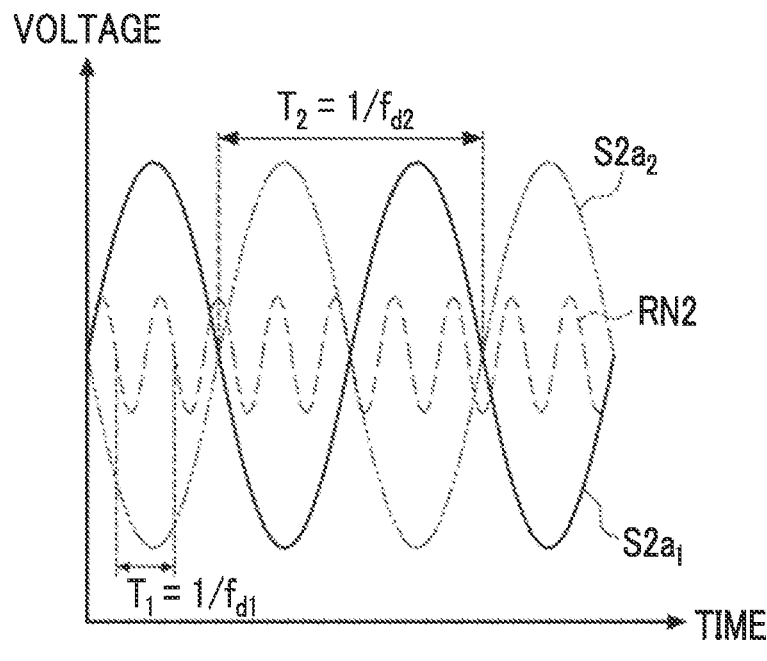
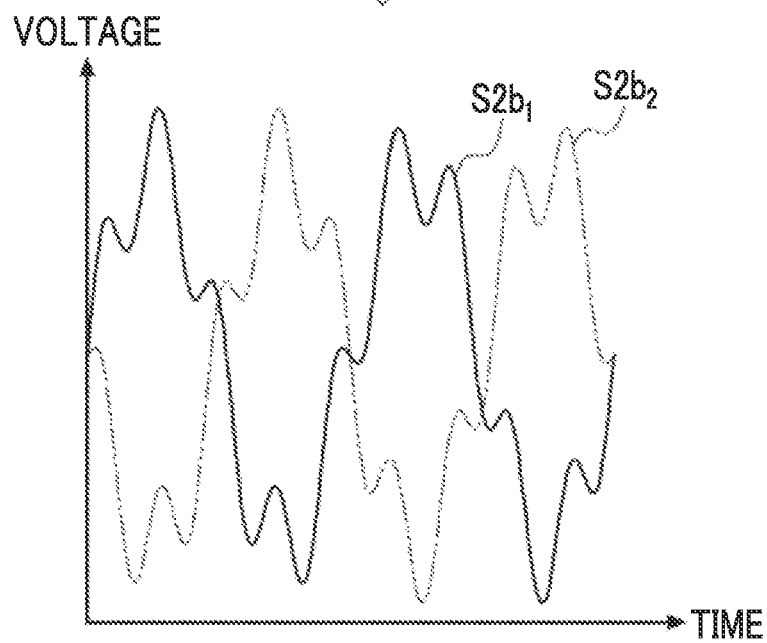

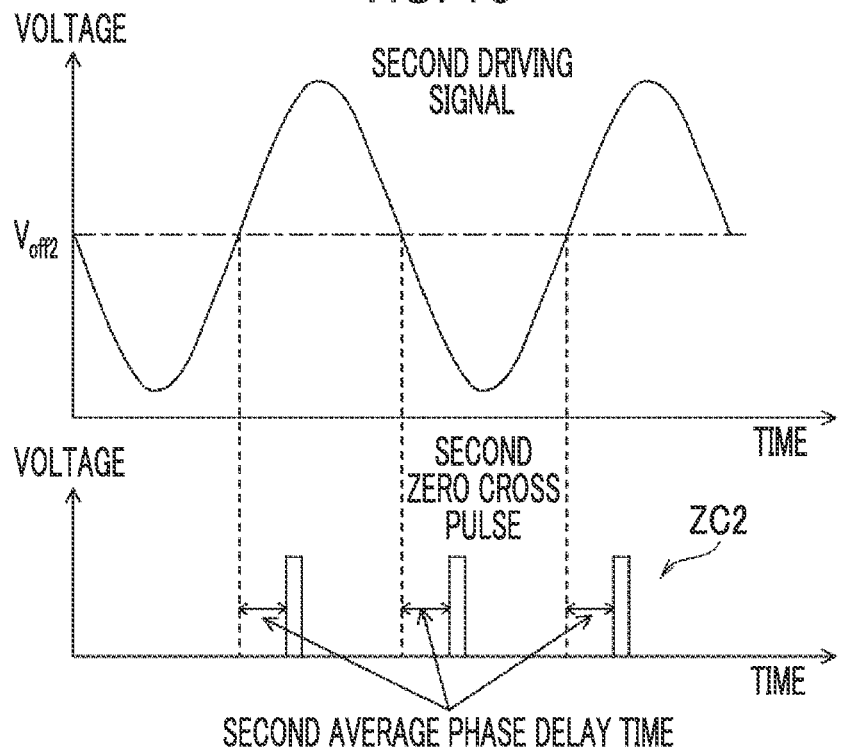

OPTICAL SCANNING DEVICE, DRIVING METHOD OF OPTICAL SCANNING DEVICE, AND IMAGE DRAWING SYSTEM

CROSS-REFERENCE TO RELATED APPLICATIONS

This application claims priority from Japanese Patent Application No. 2022-050810, filed on Mar. 25, 2022, the entire disclosure of which is incorporated herein by reference.

BACKGROUND

1. Technical Field

The present disclosure relates to an optical scanning device, a driving method of an optical scanning device, and an image drawing system.

2. Description of the Related Art

A micromirror device (also referred to as a microscanner) has been known as one of micro electro mechanical systems (MEMS) devices manufactured using the silicon (Si) nano-fabrication technique. An optical scanning device comprising the micromirror device has a small size and low power consumption and thus, is expected to be applied to image drawing systems such as laser displays or laser projectors.

In the micromirror device, a mirror portion is formed to be capable of swinging around a first axis and a second axis that are orthogonal to each other, and the swing of the mirror portion around each axis causes light reflected by the mirror portion to be two-dimensionally scanned. In addition, a micromirror device that can perform Lissajous scanning of light by causing a mirror portion to resonate around each axis has been known.

JP2016-184018A discloses a technique for selecting a driving frequency of a MEMS mirror and a rate at which one cycle of scanning of the MEMS mirror is performed, based on an amplitude and a phase of the MEMS mirror.

SUMMARY

An output signal of an angle detection sensor that detects an angle of the mirror portion around the first axis includes a noise and the like caused by the swing of the mirror portion around the second axis. Thus, detection accuracy of the angle of the mirror portion around the first axis may be decreased. Similarly, an output signal of an angle detection sensor that detects an angle of the mirror portion around the second axis includes a noise and the like caused by the swing of the mirror portion around the first axis. Thus, detection accuracy of the angle of the mirror portion around the second axis may be decreased.

In the technique disclosed in JP2016-184018A, the detection accuracy of the angle of the mirror portion around the first axis and of the angle of the mirror portion around the second axis is not considered.

The present disclosure is conceived in view of the above matter, and an object thereof is to provide an optical scanning device, a driving method of an optical scanning device, and an image drawing system that can suppress a decrease in detection accuracy of an angle of a mirror portion around a first axis and of an angle of the mirror portion around a second axis.

An optical scanning device according to an aspect of the present disclosure is an optical scanning device comprising a mirror portion that has a reflecting surface on which an incidence ray is reflected, a first actuator that causes the mirror portion to swing around a first axis which is in a plane including the reflecting surface at a time of a standstill of the mirror portion, a second actuator that causes the mirror portion to swing around a second axis which is in the plane including the reflecting surface at the time of the standstill of the mirror portion and which intersects with the first axis, a first angle detection sensor that outputs a signal corresponding to an angle of the mirror portion around the first axis, a second angle detection sensor that outputs a signal corresponding to an angle of the mirror portion around the second axis, and at least one processor, in which the processor is configured to provide a first driving signal having a first driving frequency to the first actuator, provide a second driving signal having a second driving frequency to the second actuator, derive a first integrated value by integrating a first phase delay time of the output signal of the first angle detection sensor with respect to a first signal to be referred to corresponding to the first driving signal, the number of times that is greater by a factor of a natural number than the number of times corresponding to a period of time of one frame of a motion image to be drawn, and derive a second integrated value by integrating a second phase delay time of the output signal of the second angle detection sensor with respect to a second signal to be referred to corresponding to the second driving signal, the number of times that is greater by a factor of a natural number than the number of times corresponding to the period of time of one frame.

In the optical scanning device according to the aspect of the present disclosure, the first signal to be referred to may be the first driving signal, and the second signal to be referred to may be the second driving signal.

In addition, in the optical scanning device according to the aspect of the present disclosure, the processor may be configured to derive the first integrated value after binarizing the first driving signal and the output signal of the first angle detection sensor, and derive the second integrated value after binarizing the second driving signal and the output signal of the second angle detection sensor.

In addition, in the optical scanning device according to the aspect of the present disclosure, the processor may be configured to derive a first average phase delay time that is an average value of the first phase delay time, by dividing the first integrated value by the number of times of integration, derive a second average phase delay time that is an average value of the second phase delay time, by dividing the second integrated value by the number of times of integration, output a first reference signal representing that the angle of the mirror portion around the first axis is equal to a first reference angle, at a point in time when the first average phase delay time elapses from a point in time when the first driving signal represents that the angle of the mirror portion around the first axis is equal to the first reference angle, and output a second reference signal representing that the angle of the mirror portion around the second axis is equal to a second reference angle, at a point in time when the second average phase delay time elapses from a point in time when the second driving signal represents that the angle of the mirror portion around the second axis is equal to the second reference angle.

In addition, in the optical scanning device according to the aspect of the present disclosure, the first reference angle and the second reference angle may be zero.

A driving method of an optical scanning device according to another aspect of the present disclosure is a driving method of an optical scanning device including a mirror portion that has a reflecting surface on which an incidence ray is reflected, a first actuator that causes the mirror portion to swing around a first axis which is in a plane including the reflecting surface at a time of a standstill of the mirror portion, a second actuator that causes the mirror portion to swing around a second axis which is in the plane including the reflecting surface at the time of the standstill of the mirror portion and which intersects with the first axis, a first angle detection sensor that outputs a signal corresponding to an angle of the mirror portion around the first axis, and a second angle detection sensor that outputs a signal corresponding to an angle of the mirror portion around the second axis, the driving method comprising providing a first driving signal having a first driving frequency to the first actuator, providing a second driving signal having a second driving frequency to the second actuator, deriving a first integrated value by integrating a first phase delay time of the output signal of the first angle detection sensor with respect to a first signal to be referred to corresponding to the first driving signal, the number of times that is greater by a factor of a natural number than the number of times corresponding to a period of time of one frame of a motion image to be drawn, and deriving a second integrated value by integrating a second phase delay time of the output signal of the second angle detection sensor with respect to a second signal to be referred to corresponding to the second driving signal, the number of times that is greater by a factor of a natural number than the number of times corresponding to the period of time of one frame.

In addition, an image drawing system according to still another aspect of the present disclosure comprises above any optical scanning device, and a light source that irradiates the mirror portion with light.

According to the present disclosure, a decrease in detection accuracy of the angle of the mirror portion around the first axis and of the angle of the mirror portion around the second axis can be suppressed.

BRIEF DESCRIPTION OF THE DRAWINGS

FIG. 7 is a diagram showing an example of signals output from a pair of second angle detection sensors.

FIG. 16 is a diagram for describing generation processing of a second zero cross pulse.

FIG. 17 is a flowchart showing an example of first average phase delay time derivation processing.

FIG. 18 is a flowchart showing an example of second average phase delay time derivation processing.

DETAILED DESCRIPTION

Hereinafter, an embodiment according to the technique of the present disclosure will be described in detail with reference to the drawings.

Figure 1:
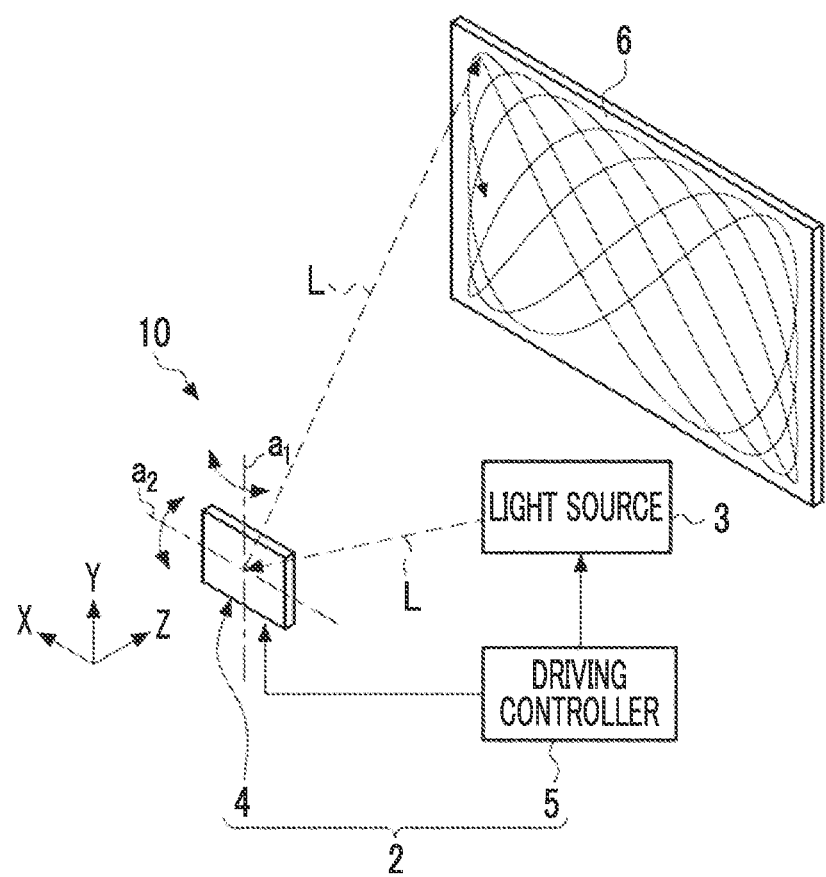
FIG. 1 is a schematic diagram of an image drawing system.

First, a configuration of an image drawing system 10 according to the present embodiment will be described with reference to FIG. 1. As shown in FIG. 1, the image drawing system 10 comprises an optical scanning device 2 and a light source 3. The optical scanning device 2 comprises a micromirror device (hereinafter, referred to as an "MMD") 4 and a driving controller 5. The driving controller 5 is an example of a processor according to the embodiment of the technique of the disclosure.

The image drawing system 10 draws an image by optically scanning a surface to be scanned 6 by reflecting a light beam L of irradiation from the light source 3 using the MMD 4 under control of the driving controller 5. The surface to be scanned 6 is, for example, a screen for projecting the image, or a retina of an eye of a person.

The image drawing system 10 is applied to, for example, a Lissajous scanning type laser display. Specifically, the image drawing system 10 can be applied to a laser scanning display such as augmented reality (AR) glasses or virtual reality (VR) glasses.

The MMD 4 is a piezoelectric biaxial drive type micromirror device capable of causing a mirror portion 20 (see FIG. 2) to swing around a first axis $a_1$ and around a second axis $a_2$ orthogonal to the first axis $a_1$. Hereinafter, a direction parallel to the second axis $a_2$ will be referred to as an X direction, a direction parallel to the first axis $a_1$ will be referred to as a Y direction, and a direction orthogonal to the first axis $a_1$ and to the second axis $a_2$ will be referred to as a Z direction. In the present embodiment, while an example in which the first axis $a_1$ is orthogonal to (that is, perpendicularly intersects with) the second axis $a_2$ is shown, the first axis $a_1$ may intersect with the second axis $a_2$ at an angle other than 90°. Here, intersecting means being within a constant angle range that is centered at 90 degrees and that includes a permissible error.

The light source 3 is a laser device that emits, for example, laser light as the light beam L. For example, the light source 3 outputs laser light of three colors of red (R), green (G), and blue (B). It is preferable that the light source 3 perpendicularly irradiates a reflecting surface 20A (see FIG. 2) comprised in the mirror portion 20 with the light beam L in a state where the mirror portion 20 of the MMD 4 is at a standstill. In a case where the reflecting surface 20A is perpendicularly irradiated with the light beam L from the light source 3, the light source 3 may be an obstacle in the drawing performed by scanning the surface to be scanned 6 with the light beam L. Thus, it is preferable that the reflecting surface 20A is perpendicularly irradiated with the light beam L emitted from the light source 3 by controlling the light beam L using an optical system such as a beam splitter. The optical system may include a lens or may not include a lens. In addition, an angle at which the reflecting surface 20A is irradiated with the light beam L emitted from the light source 3 is not limited to a perpendicular angle. The reflecting surface 20A may be irradiated with the light beam L in an inclined manner.

The driving controller 5 outputs a driving signal to the light source 3 and to the MMD 4 based on optical scanning information. The light source 3 generates the light beam L based on the input driving signal and irradiates the MMD 4 with the light beam L. The MMD 4 causes the mirror portion 20 to swing around the first axis $a_1$ and the second axis $a_2$ based on the input driving signal.

By causing the mirror portion 20 to resonate around each of the first axis $a_1$ and the second axis $a_2$ via the driving controller 5, the light beam L reflected by the mirror portion 20 is scanned onto the surface to be scanned 6 such that the light beam L draws a Lissajous waveform. This optical scanning method is called a Lissajous scanning method.

Figure 2:
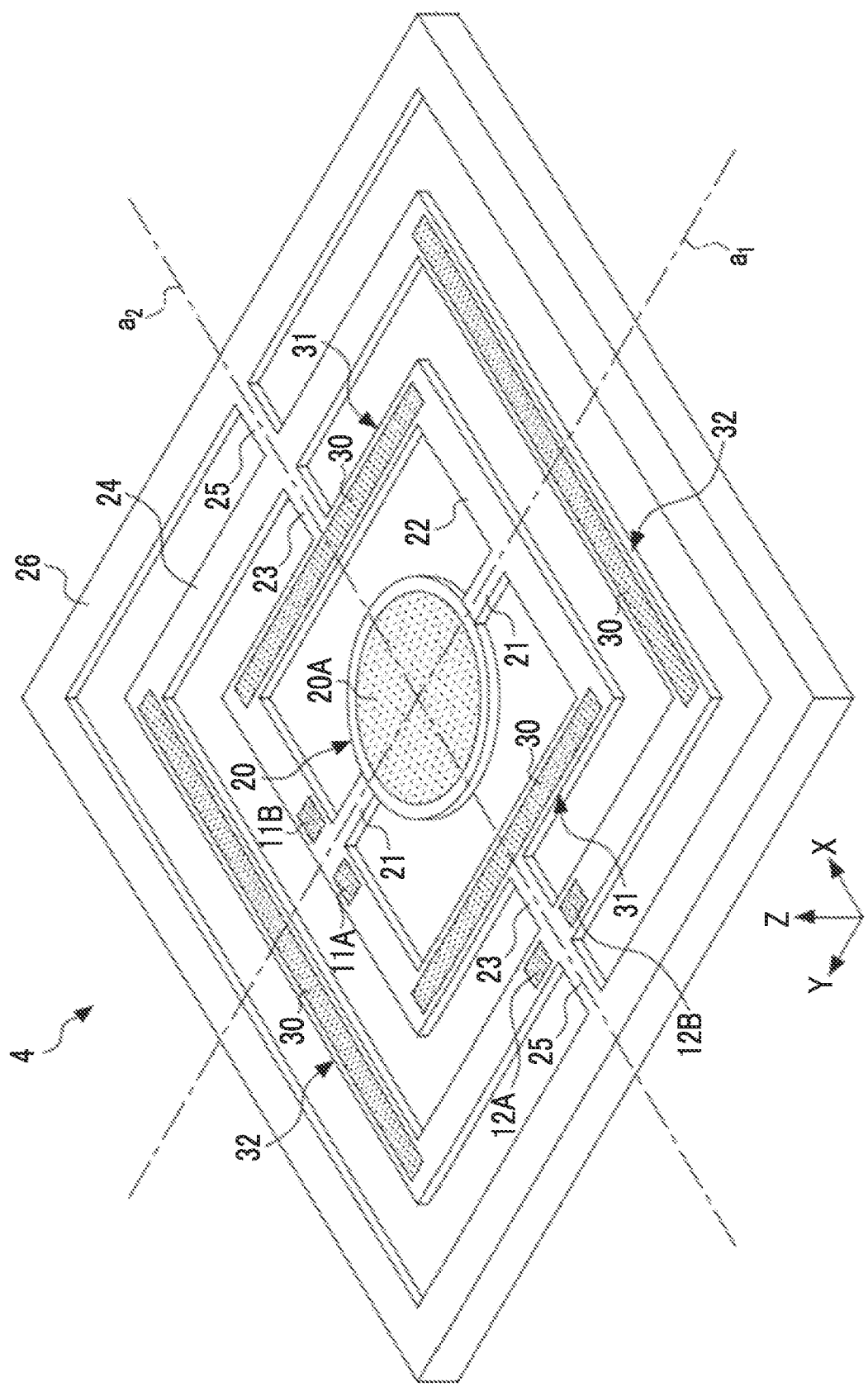
FIG. 2 is an external perspective view of a micromirror device.

Next, a configuration of the MMD 4 according to the present embodiment will be described with reference to FIG. 2. As shown in FIG. 2, the MMD 4 includes the mirror portion 20, a first support portion 21, a first movable frame 22, a second support portion 23, a second movable frame 24, a connecting portion 25, and a fixed frame 26. The MMD 4 is a so-called MEMS scanner.

The mirror portion 20 has the reflecting surface 20A for reflecting an incidence ray. The reflecting surface 20A is provided on one surface of the mirror portion 20 and is formed with a thin metal film of, for example, gold (Au), aluminum (Al), silver (Ag), or a silver alloy. A shape of the reflecting surface 20A is, for example, a circular shape centered at an intersection between the first axis $a_1$ and the second axis $a_2$.

The first axis $a_1$ and the second axis $a_2$ are present in a plane including the reflecting surface 20A at a time of a standstill when the mirror portion 20 is at a standstill. A planar shape of the MMD 4 is a rectangular shape and is axially symmetric with respect to the first axis $a_1$ and axially symmetric with respect to the second axis $a_2$.

The first support portion 21 is arranged outside the mirror portion 20 at each of positions that face each other with the second axis $a_2$ interposed therebetween. The first support portions 21 are connected to the mirror portion 20 on the first axis $a_1$ and support the mirror portion 20 to be capable of swinging around the first axis $a_1$. In the present embodiment, the first support portions 21 are torsion bars that stretch along the first axis $a_1$.

The first movable frame 22 is a frame having a rectangular shape surrounding the mirror portion 20 and is connected to the mirror portion 20 through the first support portion 21 on the first axis $a_1$. A piezoelectric element 30 is formed on the first movable frame 22 at each of positions that face each other with the first axis $a_1$ interposed therebetween. In such a manner, a pair of first actuators 31 are configured by forming two piezoelectric elements 30 on the first movable frame 22.

The pair of first actuators 31 are arranged at positions that face each other with the first axis $a_1$ interposed therebetween. The first actuators 31 cause the mirror portion 20 to swing around the first axis $a_1$ by applying rotational torque around the first axis $a_1$ to the mirror portion 20.

The second support portion 23 is arranged outside the first movable frame 22 at each of positions that face each other with the first axis $a_1$ interposed therebetween. The second support portions 23 are connected to the first movable frame 22 on the second axis $a_2$ and support the first movable frame 22 and the mirror portion 20 to be capable of swinging around the second axis $a_2$. In the present embodiment, the second support portions 23 are torsion bars that stretch along the second axis $a_2$.

The second movable frame 24 is a frame having a rectangular shape surrounding the first movable frame 22 and is connected to the first movable frame 22 through the second support portion 23 on the second axis $a_2$. The piezoelectric element 30 is formed on the second movable frame 24 at each of positions that face each other with the second axis $a_2$ interposed therebetween. In such a manner, a pair of second actuators 32 are configured by forming two piezoelectric elements 30 on the second movable frame 24.

The pair of second actuators 32 are arranged at positions that face each other with the second axis $a_2$ interposed therebetween. The second actuators 32 cause the mirror portion 20 to swing around the second axis $a_2$ by applying rotational torque about the second axis $a_2$ to the mirror portion 20 and to the first movable frame 22.

The connecting portion 25 is arranged outside the second movable frame 24 at each of positions that face each other with the first axis $a_1$ interposed therebetween. The connecting portions 25 are connected to the second movable frame 24 on the second axis $a_2$.

The fixed frame 26 is a frame having a rectangular shape surrounding the second movable frame 24 and is connected to the second movable frame 24 through the connecting portion 25 on the second axis $a_2$.

In addition, a pair of first angle detection sensors 11A and 11B are provided in the first movable frame 22 near the first support portions 21 at positions that face each other with the first axis $a_1$ interposed therebetween. Each of the pair of first angle detection sensors 11A and 11B is configured with a piezoelectric element. Each of the first angle detection sensors 11A and 11B outputs a signal by converting a force applied by deformation of the first support portion 21 accompanied by rotational movement of the mirror portion 20 around the first axis $a_1$ into a voltage. That is, the first angle detection sensors 11A and 11B output signals corresponding to an angle of the mirror portion 20 around the first axis $a_1$.

In addition, a pair of second angle detection sensors 12A and 12B are provided in the second movable frame 24 near the second support portions 23 at positions that face each other with the second axis $a_2$ interposed therebetween. Each of the pair of second angle detection sensors 12A and 12B is configured with a piezoelectric element. Each of the second angle detection sensors 12A and 12B outputs a signal by converting a force applied by deformation of the second support portion 23 accompanied by rotational movement of the mirror portion 20 around the second axis $a_2$ into a voltage. That is, the second angle detection sensors 12A and 12B output signals corresponding to the angle of the mirror portion 20 around the second axis $a_2$.

In FIG. 2, wiring lines and electrode pads for providing driving signals to the first actuators 31 and the second actuators 32 are not shown. In addition, in FIG. 2, wiring lines and electrode pads for outputting signals from the first angle detection sensors 11A and 11B and from the second angle detection sensors 12A and 12B are not shown. A plurality of electrode pads are provided on the fixed frame 26.

A deflection angle (hereinafter, referred to as a "first deflection angle") $\theta_1$ of the mirror portion 20 around the first axis $a_1$ is controlled based on the driving signal (hereinafter, referred to as a "first driving signal") provided to the first actuators 31 by the driving controller 5. The first driving signal is, for example, a sinusoidal alternating current voltage. The first driving signal includes a driving voltage waveform $V_{1A}(t)$ applied to one of the pair of first actuators 31 and a driving voltage waveform $V_{1B}(t)$ applied to the other. The driving voltage waveform $V_{1A}(t)$ and the driving voltage waveform $V_{1B}(t)$ are in anti-phase with each other (that is, have a phase difference of 180°).

The first deflection angle $\theta_1$ is an angle at which a line normal to the reflecting surface 20A is inclined with respect to the Z direction in an XZ plane.

A deflection angle (hereinafter, referred to as a "second deflection angle") $\theta_2$ of the mirror portion 20 around the second axis $a_2$ is controlled based on the driving signal (hereinafter, referred to as a "second driving signal") provided to the second actuators 32 by the driving controller 5. The second driving signal is, for example, a sinusoidal alternating current voltage. The second driving signal includes a driving voltage waveform $V_{2A}(t)$ applied to one of the pair of second actuators 32 and a driving voltage waveform $V_{2B}(t)$ applied to the other. The driving voltage waveform $V_{2A}(t)$ and the driving voltage waveform $V_{2B}(t)$ are in anti-phase with each other (that is, have a phase difference of 180°).

The second deflection angle $\theta_2$ is an angle at which the line normal to the reflecting surface 20A is inclined with respect to the Z direction in a YZ plane.

Figure 3:
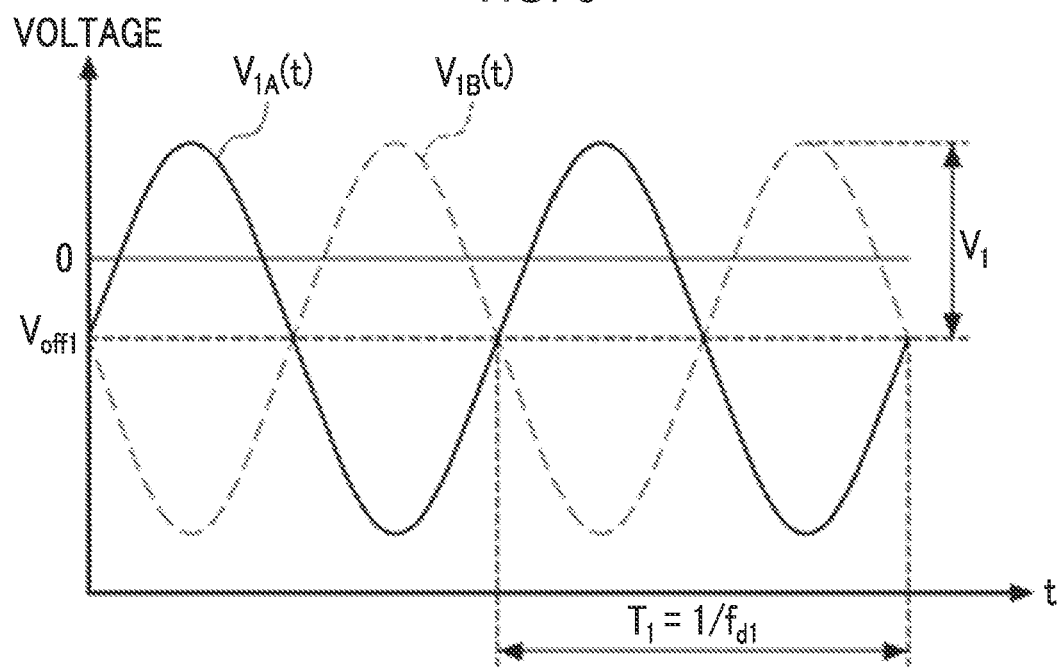
FIG. 3 is a graph showing an example of a first driving signal.
Figure 4:
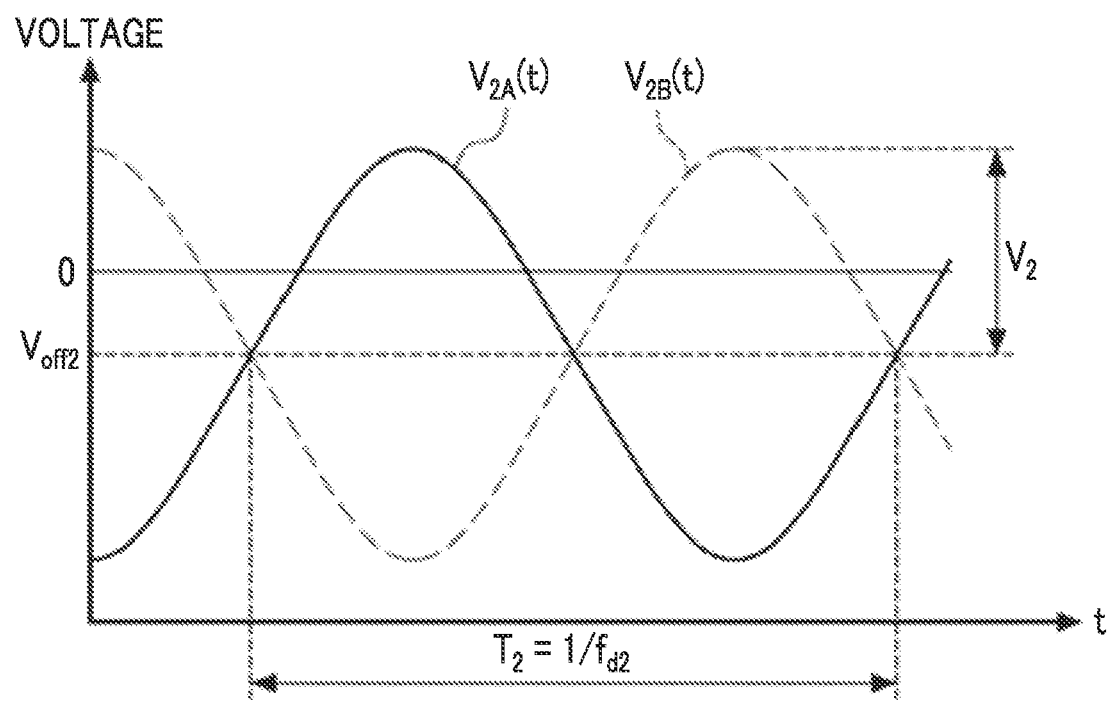
FIG. 4 is a graph showing an example of a second driving signal.

FIG. 3 shows an example of the first driving signal, and FIG. 4 shows an example of the second driving signal. FIG. 3 shows the driving voltage waveforms $V_{1A}(t)$ and $V_{1B}(t)$ included in the first driving signal. FIG. 4 shows the driving voltage waveforms $V_{2A}(t)$ and $V_{2B}(t)$ included in the second driving signal.

Each of the driving voltage waveforms $V_{1A}(t)$ and $V_{1B}(t)$ is represented as follows.

$$V_{1A}(t)=V_{off1}+V_1 \sin(2\pi f_{d1}t)$$

$$V_{1B}(t)=V_{off1}+V_1 \sin(2\pi f_{d1}t+\alpha)$$

Here, $V_1$ is an amplitude voltage. $V_{off1}$ is a bias voltage. $V_{off1}$ may be zero. In addition, $f_{d1}$ is a driving frequency (hereinafter, referred to as a "first driving frequency"). In addition, t is time. In addition, $\alpha$ is a phase difference between the driving voltage waveforms $V_{1A}(t)$ and $V_{1B}(t)$. In the present embodiment, for example, $\alpha=180°$ is assumed.

By applying the driving voltage waveforms $V_{1A}(t)$ and $V_{1B}(t)$ to the pair of first actuators 31, the mirror portion 20 swings around the first axis $a_1$ with the first driving frequency $f_{d1}$.

Each of the driving voltage waveforms $V_{2A}(t)$ and $V_{2B}(t)$ is represented as follows.

$$V_{2A}(t)=V_{off2}+V_2 \sin(2\pi f_{d2}t+\varphi)$$

$$V_{2B}(t)=V_{off2}+V_2 \sin(2\pi f_{d2}t+\beta+\varphi)$$

Here, $V_2$ is an amplitude voltage. $V_{off2}$ is a bias voltage. $V_{off2}$ may be zero. In addition, $f_{d2}$ is a driving frequency (hereinafter, referred to as a "second driving frequency"). In addition, t is time. In addition, $\beta$ is a phase difference between the driving voltage waveforms $V_{2A}(t)$ and $V_{2B}(t)$. In the present embodiment, for example, $\beta=180°$ is assumed. In addition, $\varphi$ is a phase difference between the driving voltage waveforms $V_{1A}(t)$ and $V_{1B}(t)$ and the driving voltage waveforms $V_{2A}(t)$ and $V_{2B}(t)$.

By applying the driving voltage waveforms $V_{2A}(t)$ and $V_{2B}(t)$ to the pair of second actuators 32, the mirror portion 20 swings around the second axis $a_2$ with the second driving frequency $f_{d2}$.

In the present embodiment, the first driving frequency $f_{d1}$ is set to match a resonance frequency of the mirror portion 20 around the first axis $a_1$. The second driving frequency $f_{d2}$ is set based on the first driving frequency $f_{d1}$ and on a frequency ratio H between the first driving frequency $f_{d1}$ and the second driving frequency $f_{d2}$. The frequency ratio H is set based on scanning density of light corresponding to a drawing pattern. The MMD 4 is set such that the second driving frequency $f_{d2}$ matches a resonance frequency of the mirror portion 20 around the second axis $a_2$. In the present embodiment, $f_{d1}>f_{d2}$ is assumed. That is, the mirror portion 20 has a higher swing frequency around the first axis $a_1$ than a swing frequency around the second axis $a_2$. The first driving frequency $f_{d1}$ and the second driving frequency $f_{d2}$ may not necessarily match the resonance frequency. For example, each of the first driving frequency $f_{d1}$ and the second driving frequency $f_{d2}$ may be a frequency within a frequency range near the resonance frequency (for example, a half-width range of a frequency distribution having the resonance frequency as a peak value). For example, this frequency range is within a range of a so-called Q-value.

Figure 5:
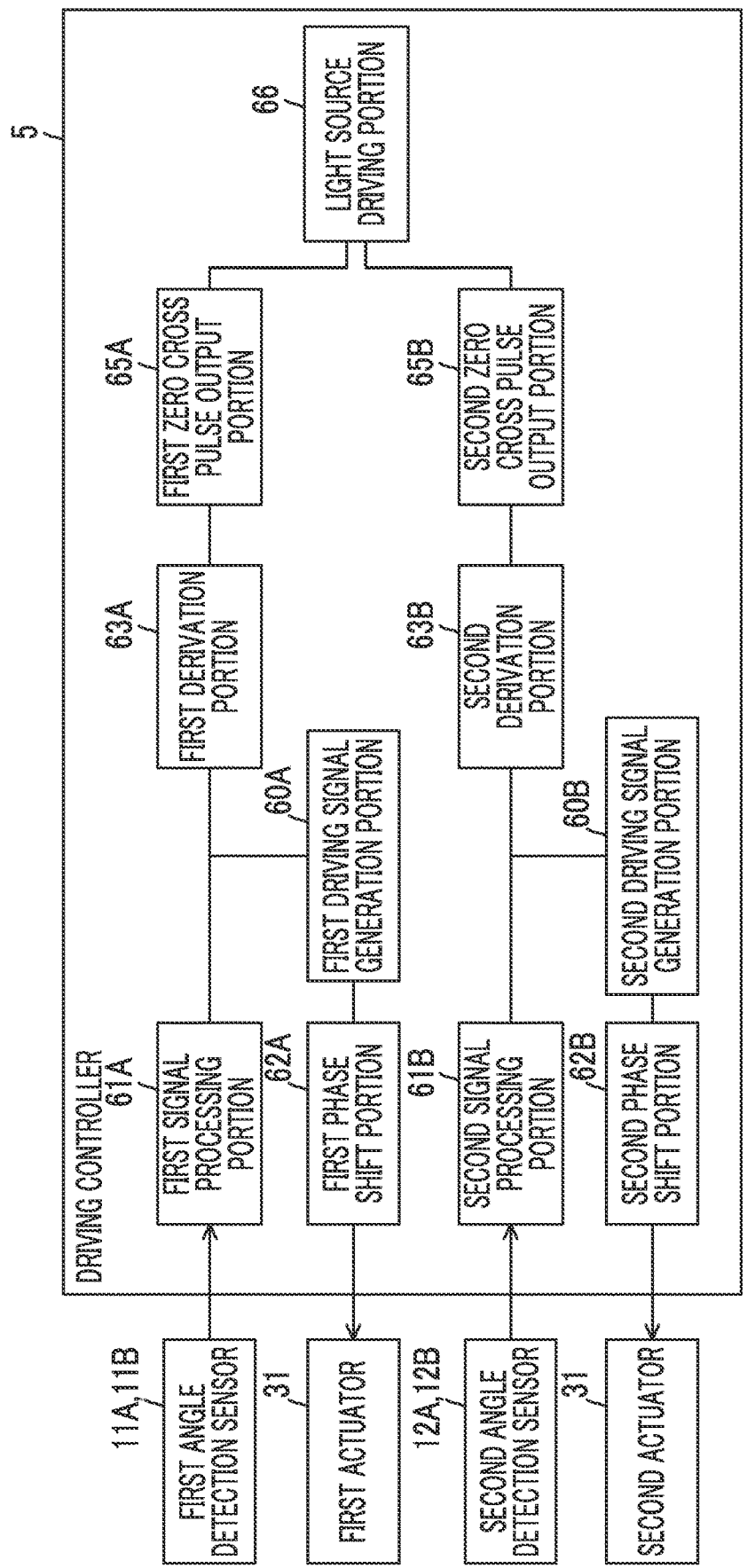
FIG. 5 is a block diagram showing an example of a functional configuration of a driving controller.

Next, a functional configuration of the driving controller 5 will be described with reference to FIG. 5. As shown in FIG. 5, the driving controller 5 includes a first driving signal generation portion 60A, a second driving signal generation portion 60B, a first signal processing portion 61A, a second signal processing portion 61B, a first phase shift portion 62A, a second phase shift portion 62B, a first derivation portion 63A, a second derivation portion 63B, a first zero cross pulse output portion 65A, a second zero cross pulse output portion 65B, and a light source driving portion 66.

The first driving signal generation portion 60A, the first signal processing portion 61A, and the first phase shift portion 62A may perform a feedback control to maintain a vibration state where the swing of the mirror portion 20 around the first axis $a_1$ has a designated frequency. The second driving signal generation portion 60B, the second signal processing portion 61B, and the second phase shift portion 62B may perform a feedback control to maintain a vibration state where the swing of the mirror portion 20 around the second axis $a_2$ has a designated frequency.

The first driving signal generation portion 60A generates the first driving signal including the driving voltage waveforms $V_{1A}(t)$ and $V_{1B}(t)$ based on a reference waveform and provides the generated first driving signal to the pair of first actuators 31 through the first phase shift portion 62A. Accordingly, the mirror portion 20 swings around the first axis $a_1$.

The second driving signal generation portion 60B generates the second driving signal including the driving voltage waveforms $V_{2A}(t)$ and $V_{2B}(t)$ based on the reference waveform and provides the generated second driving signal to the pair of second actuators 32 through the second phase shift portion 62B. Accordingly, the mirror portion 20 swings around the second axis $a_2$.

The first driving signal generated by the first driving signal generation portion 60A and the second driving signal generated by the second driving signal generation portion 60B are synchronized in phase as shown by φ in the expressions showing the driving voltage waveforms $V_{2A}(t)$ and $V_{2B}(t)$ included in the second driving signal.

The first angle detection sensors 11A and 11B output the signals corresponding to the angle of the mirror portion 20 around the first axis $a_1$. The second angle detection sensors 12A and 12B output the signals corresponding to the angle of the mirror portion 20 around the second axis $a_2$.

Figure 6:
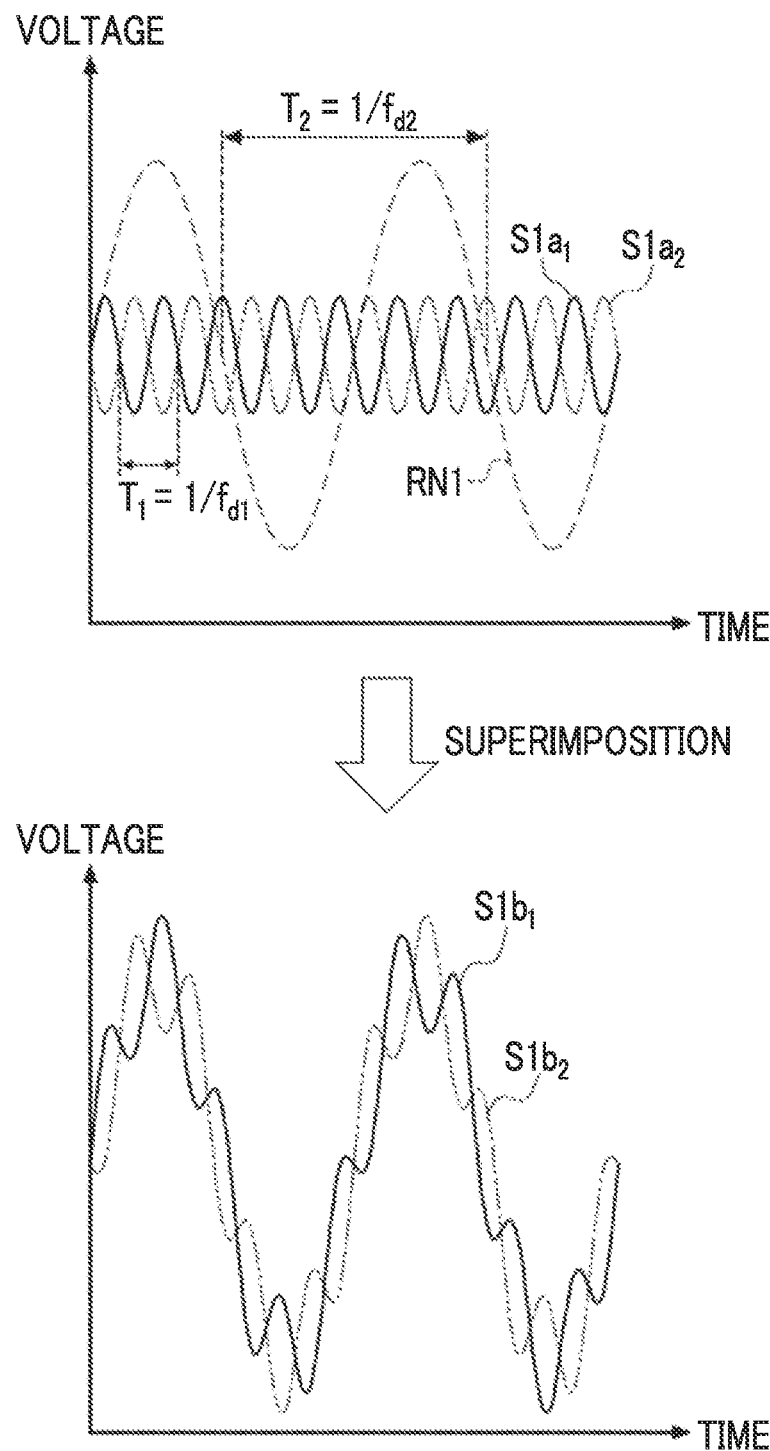
FIG. 6 is a diagram showing an example of signals output from a pair of first angle detection sensors.

FIG. 6 shows an example of the signals output from the pair of first angle detection sensors 11A and 11B. In FIG. 6, $S1a_1$ and $S1a_2$ represent the signals output from the pair of first angle detection sensors 11A and 11B in a case where the mirror portion 20 is caused to swing around only the first axis $a_1$ and to not swing around the second axis $a_2$. The signals $S1a_1$ and $S1a_2$ are waveform signals similar to a sinusoidal wave having the first driving frequency $f_{d1}$ and are in anti-phase with each other.

In a case where the mirror portion 20 is caused to swing around the first axis $a_1$ and around the second axis $a_2$ at the same time, a vibration noise RN1 caused by the swing of the mirror portion 20 around the second axis $a_2$ is superimposed on the output signals of the pair of first angle detection sensors 11A and 11B. $S1b_1$ represents a signal after the vibration noise RN1 is superimposed on the signal $S1a_1$. $S1b_2$ represents a signal after the vibration noise RN1 is superimposed on the signal $S1a_2$. In the example in FIG. 6, the vibration noise RN1 is shown in a highlighted manner for description of the present embodiment.

FIG. 7 shows an example of the signals output from the pair of second angle detection sensors 12A and 12B. In FIG. 7, $S2a_1$ and $S2a_2$ represent the signals output from the pair of second angle detection sensors 12A and 12B in a case where the mirror portion 20 is caused to swing around only the second axis $a_2$ and to not swing around the first axis $a_1$. The signals $S2a_1$ and $S2a_2$ are waveform signals similar to a sinusoidal wave having the second driving frequency $f_{d2}$ and are in anti-phase with each other.

In a case where the mirror portion 20 is caused to swing around the first axis $a_1$ and around the second axis $a_2$ at the same time, a vibration noise RN2 caused by the swing of the mirror portion 20 around the first axis $a_1$ is superimposed on the output signals of the pair of second angle detection sensors 12A and 12B. $S2b_1$ represents a signal obtained by the superimposition of the vibration noise RN2 on the signal $S2a_1$. $S2b_2$ represents a signal obtained by the superimposition of the vibration noise RN2 on the signal $S2a_2$. In the example in FIG. 7, the vibration noise RN2 is shown in a highlighted manner for description of the present embodiment.

The first signal processing portion 61A generates a signal (hereinafter, referred to as a "first angle detection signal") $S1c$ obtained by removing the vibration noise RN1 based on $S1a_1$ and $S1a_2$ output from the pair of first angle detection sensors 11A and 11B. The second signal processing portion 61B generates a signal (hereinafter, referred to as a "second angle detection signal") $S2c$ obtained by removing the vibration noise RN2 based on $S2a_1$ and $S2a_2$ output from the pair of second angle detection sensors 12A and 12B.

Figure 8:
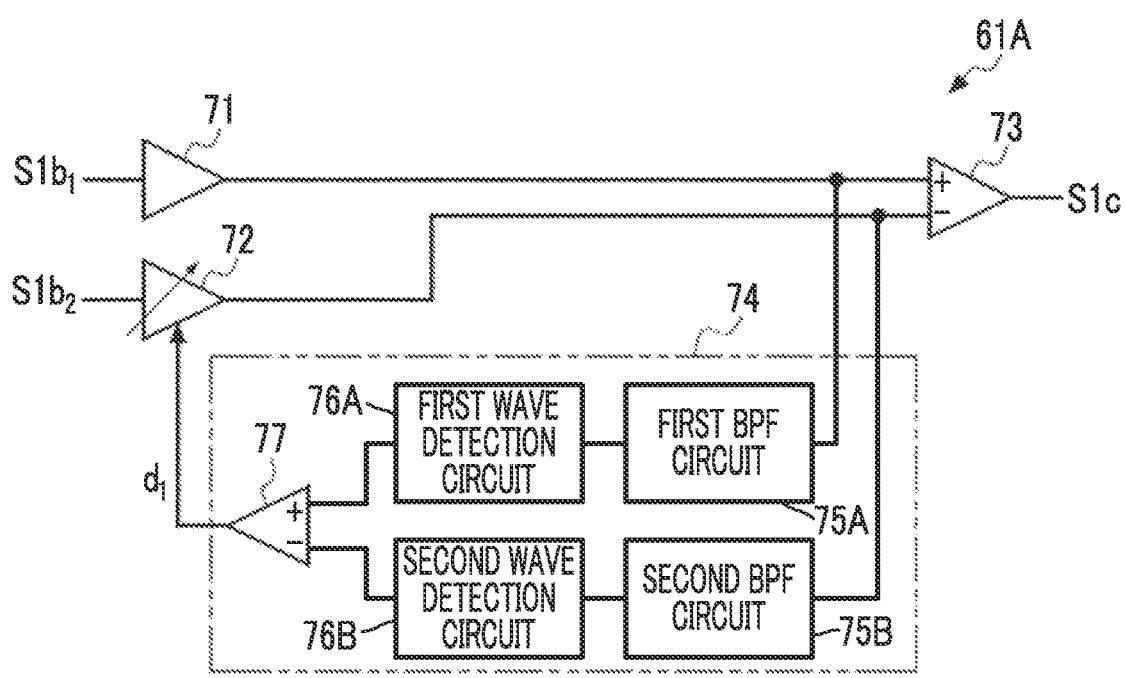
FIG. 8 is a circuit diagram showing an example of a configuration of a first signal processing portion.

The first signal processing portion 61A can be implemented by, for example, a circuit having a configuration shown in FIG. 8 as an example. As shown in FIG. 8, the first signal processing portion 61A is configured with a buffer amplifier 71, a variable gain amplifier 72, a subtraction circuit 73, and a gain adjustment circuit 74. The gain adjustment circuit 74 is configured with a first band pass filter (BPF) circuit 75A, a second BPF circuit 75B, a first wave detection circuit 76A, a second wave detection circuit 76B, and a subtraction circuit 77. The subtraction circuit 73 and the subtraction circuit 77 are differential amplification circuits configured with operational amplifiers.

The signal $S1b_1$ output from the first angle detection sensor 11A is input into a positive input terminal (non-inverting input terminal) of the subtraction circuit 73 through the buffer amplifier 71. In addition, a signal output from the buffer amplifier 71 branches in the middle of being input into the subtraction circuit 73 and is input into the first BPF circuit 75A in the gain adjustment circuit 74.

The signal $S1b_2$ output from the first angle detection sensor 11B is input into a negative input terminal (inverting input terminal) of the subtraction circuit 73 through the variable gain amplifier 72. In addition, a signal output from the variable gain amplifier 72 branches in the middle of being input into the subtraction circuit 73 and is input into the second BPF circuit 75B in the gain adjustment circuit 74.

Each of the first BPF circuit 75A and the second BPF circuit 75B has a passband B1 having the second driving frequency $f_{d2}$ as a center frequency. For example, the passband B1 is a frequency band of $f_{d2}\pm 5$ kH. The vibration noise RN1 has the second driving frequency $f_{d2}$ and thus, passes through the passband B1. Accordingly, the first BPF circuit 75A extracts the vibration noise RN1 from the signal input from the buffer amplifier 71 and outputs the vibration noise RN1. The second BPF circuit 75B extracts the vibration noise RN1 from the signal input from the variable gain amplifier 72 and outputs the vibration noise RN1.

Each of the first wave detection circuit 76A and the second wave detection circuit 76B is configured with, for example, a root mean squared value to direct current converter (RMS-DC converter). The first wave detection circuit 76A converts an amplitude of the vibration noise RN1 input from the first BPF circuit 75A into a DC voltage signal and inputs the DC voltage signal into a positive input terminal of the subtraction circuit 77. The second wave detection circuit 76B converts the amplitude of the vibration noise RN1 input from the second BPF circuit 75B into a DC voltage signal and inputs the DC voltage signal into a negative input terminal of the subtraction circuit 77.

The subtraction circuit 77 outputs a value $d_1$ obtained by subtracting the DC voltage signal input from the second wave detection circuit 76B, from the DC voltage signal input from the first wave detection circuit 76A. The value corresponds to a difference between the amplitude of the vibration noise RN1 included in the signal $S1b_1$ output from the first angle detection sensor 11A and the amplitude of the vibration noise RN1 included in the signal $S1b_2$ output from the first angle detection sensor 11B. The subtraction circuit 77 inputs the value $d_1$ into a gain adjustment terminal of the variable gain amplifier 72 as a gain adjustment value.

The variable gain amplifier 72 adjusts an amplitude level of the signal $S1b_2$ by multiplying the signal $S1b_2$ input from the first angle detection sensor 11B by the value $d_1$ input as the gain adjustment value. In such a manner, by performing a feedback control via the gain adjustment circuit 74, the amplitude of the vibration noise RN1 included in the signal $S1b_2$ after passing through the variable gain amplifier 72 is adjusted to match the amplitude of the vibration noise RN1 included in the signal $S1b_1$ after passing through the buffer amplifier 71.

The subtraction circuit 73 outputs a value obtained by subtracting the signal S1$b_2$ input into the negative input terminal from the signal S1$b_1$ input into the positive input terminal. Since the amplitudes of the vibration noises RN1 included in both signals are matched by the feedback control, the vibration noises RN1 included in both signals are offset by subtraction processing performed by the subtraction circuit 73. Accordingly, the first angle detection signal S1c (see FIG. 9) that is a signal obtained by removing the vibration noise RN1 is output from the subtraction circuit 73.

Figure 9:
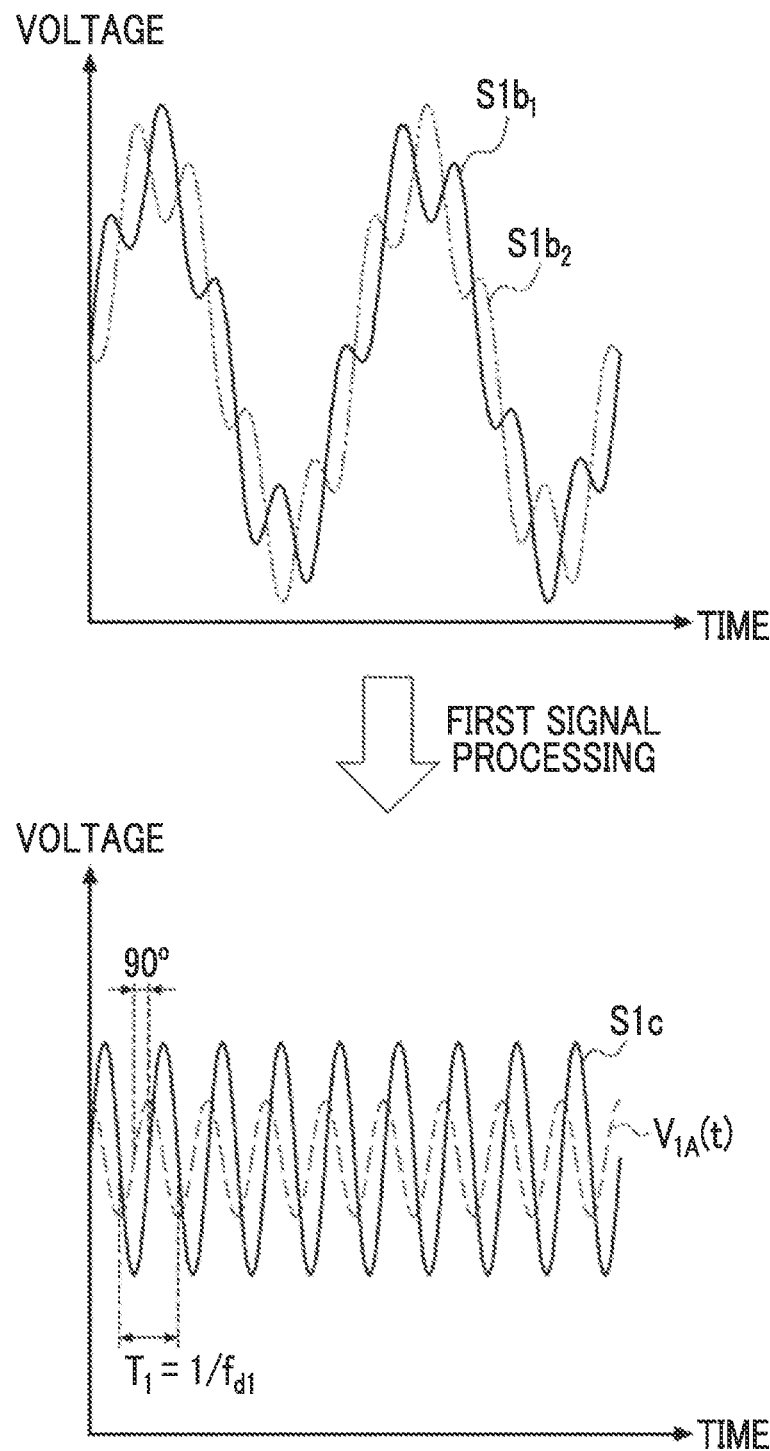
FIG. 9 is a diagram showing an example of first signal processing.

FIG. 9 shows a state where the first angle detection signal S1c is generated based on S1$b_1$ and S1$b_2$ output from the pair of first angle detection sensors 11A and 11B. The first angle detection signal S1c corresponds to a signal obtained by doubling an amplitude of the signal obtained by removing the vibration noise RN1 from the signal S1$b_1$.

In a case where the swing of the mirror portion 20 around the first axis a1 maintains a resonance state, the first angle detection signal S1c output from the first signal processing portion 61A has a delay of 90° in phase with respect to the driving voltage waveform $V_{1A}(t)$ included in the first driving signal as shown in FIG. 9.

The second signal processing portion 61B can be implemented by the same configuration as the first signal processing portion 61A and thus, will not be described.

Figure 10:
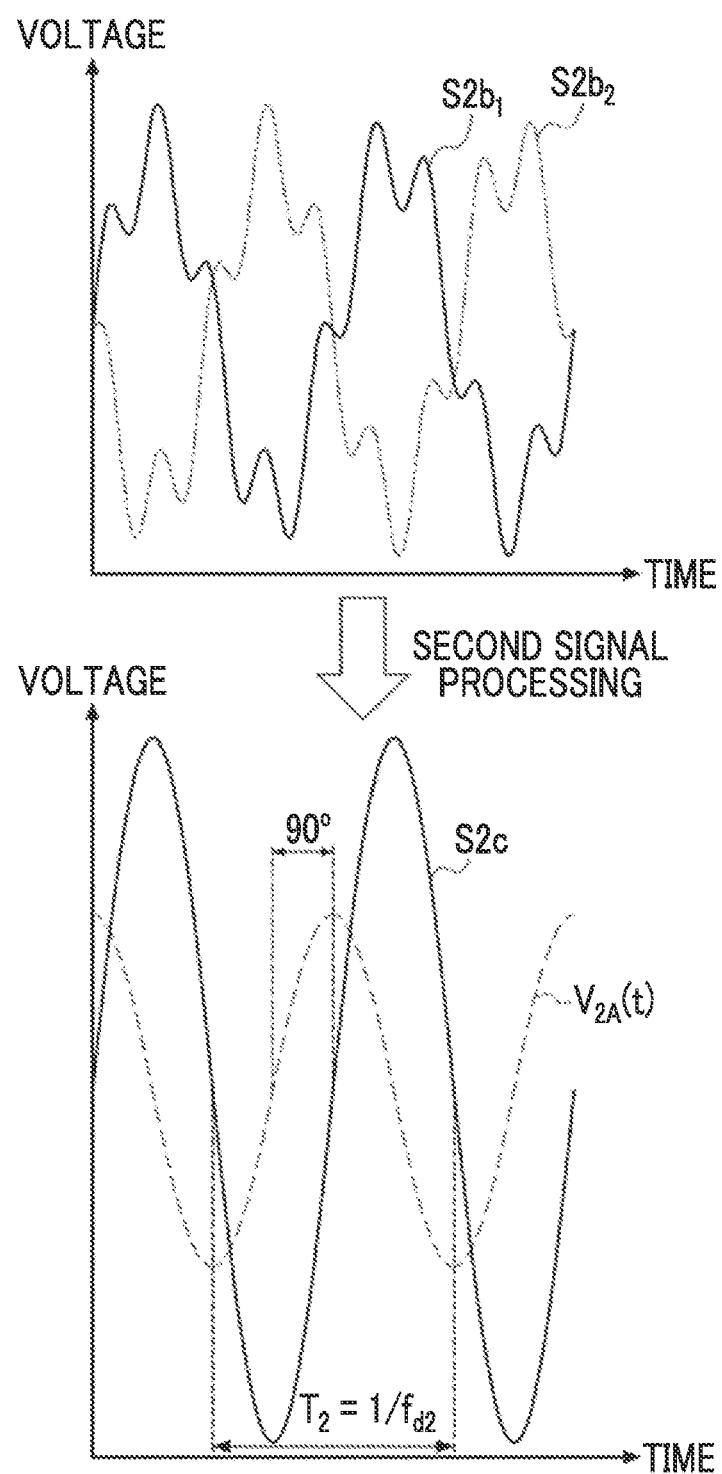
FIG. 10 is a diagram showing an example of second signal processing.

FIG. 10 shows a state where the second angle detection signal S2c is generated based on S2$b_1$ and S2$b_2$ output from the pair of second angle detection sensors 12A and 12B. The second angle detection signal S2c corresponds to a signal obtained by doubling an amplitude of the signal obtained by removing the vibration noise RN2 from the signal S2$b_1$.

In a case where the swing of the mirror portion 20 around the second axis $a_2$ maintains a resonance state, the second angle detection signal S2c output from the second signal processing portion 61B has a delay of 90° in phase with respect to the driving voltage waveform $V_{2A}(t)$ included in the second driving signal as shown in FIG. 10.

The first angle detection signal S1c generated by the first signal processing portion 61A is fed back to the first driving signal generation portion 60A. The first phase shift portion 62A shifts phases of the driving voltage waveforms output from the first driving signal generation portion 60A. For example, the first phase shift portion 62A shifts the phases by 90°.

The second angle detection signal S2c generated by the second signal processing portion 61B is fed back to the second driving signal generation portion 60B. The second phase shift portion 62B shifts phases of the driving voltage waveforms output from the second driving signal generation portion 60B. For example, the second phase shift portion 62B shifts the phases by 90°.

The first angle detection signal S1c generated by the first signal processing portion 61A is ideally a sinusoidal wave but is generally not a smooth sinusoidal wave. This is because an effect of the swing of the mirror portion 20 around the second axis $a_2$ cannot be removed in processing performed by the first signal processing portion 61A. Similarly, the second angle detection signal S2c generated by the second signal processing portion 61B is also ideally a sinusoidal wave but is generally not a smooth sinusoidal wave because an effect of the swing of the mirror portion 20 around the first axis $a_1$ remains.

Figure 11:
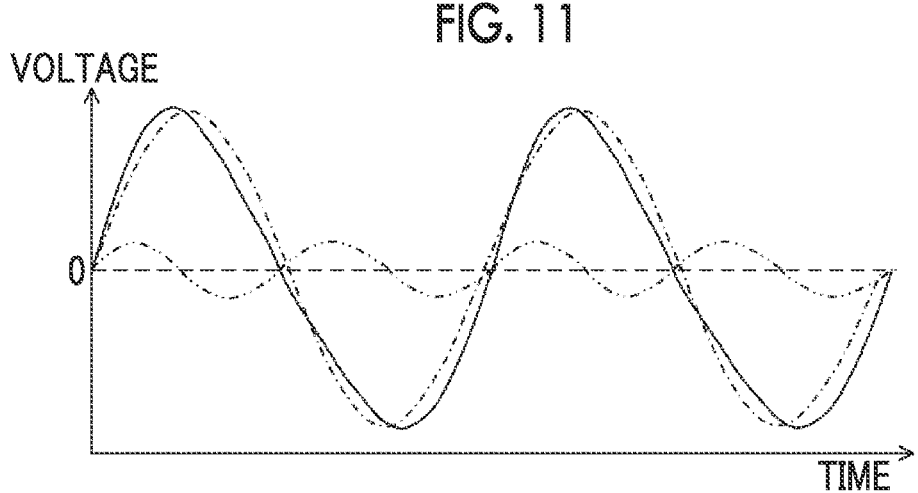
FIG. 11 is a diagram for describing a shift in output signal of an angle detection sensor.

In this case, as shown in FIG. 11 as an example, a timing at which the second angle detection signal S2c crosses zero is slightly shifted from a timing at which the second deflection angle $\theta_2$ actually becomes equal to 0°. In the example in FIG. 11, a dot dashed line shows an ideal sinusoidal waveform representing the swing of the mirror portion 20 around the second axis $a_2$, and a double dot dashed line shows a waveform of the effect of the swing of the mirror portion 20 around the first axis $a_1$. In addition, in the example in FIG. 11, a solid line represents the second angle detection signal S2c. While the second angle detection signal S2c is illustratively described in FIG. 11, the effect of the swing of the mirror portion 20 around the second axis $a_2$ is also included in the first angle detection signal S1c.

The present applicant has found that shifting of a first timing at which the second angle detection signal S2c crosses zero to before and to after a second timing at which the second deflection angle $\theta_2$ actually becomes equal to 0° is repeated. Furthermore, the present applicant has found that within a period of time of one frame of a motion image to be drawn, a total value of a shift amount in a case where the first timing is shifted to before the second timing is approximately equal to a total value of a shift amount in a case where the first timing is shifted to after the second timing.

Therefore, the first derivation portion 63A reduces the effect of the swing of the mirror portion 20 around the second axis $a_2$ by integrating a phase delay time (hereinafter, referred to as a "first phase delay time") of the first angle detection signal S1c with respect to the first driving signal within the period of time of one frame. Similarly, the second derivation portion 63B reduces the effect of the swing of the mirror portion 20 around the first axis $a_1$ by integrating a phase delay time (hereinafter, referred to as a "second phase delay time") of the second angle detection signal S2c with respect to the second driving signal within the period of time of one frame. The first driving signal is an example of a first signal to be referred to according to the embodiment of the technique of the disclosure, and the second driving signal is an example of a second signal to be referred to according to the embodiment of the technique of the disclosure.

Here, a case of using a direct digital synthesizer (DDS) for generating the first driving signal and the second driving signal in the period of time of one frame of the motion image will be illustratively described. An output frequency of the DDS is represented by Expression (1) below.

$$f_{out} = \frac{M \times f_c}{2^N} \quad (1)$$

Here, $f_{out}$ is the output frequency of the DDS. In addition, $f_c$ is a system clock frequency. N is a length of a phase accumulator. M is a tuning word value.

As described above, the first driving frequency $f_{d1}$ as a target is set to match the resonance frequency of the mirror portion 20 around the first axis $a_1$. In addition, the second driving frequency $f_{d2}$ as a target is calculated based on the first driving frequency $f_{d1}$ and on the frequency ratio H between the first driving frequency $f_{d1}$ and the second driving frequency $f_2$. The frequency ratio H is set based on the scanning density of the light corresponding to the drawing pattern. In addition, the system clock frequency and the length of the phase accumulator are known.

Accordingly, a tuning word value M1 with which the first driving frequency $f_{d1}$ is obtained can be calculated using Expression (1). Similarly, a tuning word value M2 with which the second driving frequency $f_{d2}$ is obtained can be calculated using Expression (1). In a case where a greatest common divisor of the tuning word value M1 and the tuning word value M2 is denoted by G, Expression (2) below is established.

$$M1 \times Q2 = M2 \times Q1 \tag{2}$$

Here, Q1 is a quotient obtained by dividing the tuning word value M1 by the greatest common divisor G. Q2 is a quotient obtained by dividing the tuning word value M2 by the greatest common divisor G.

Figure 12:
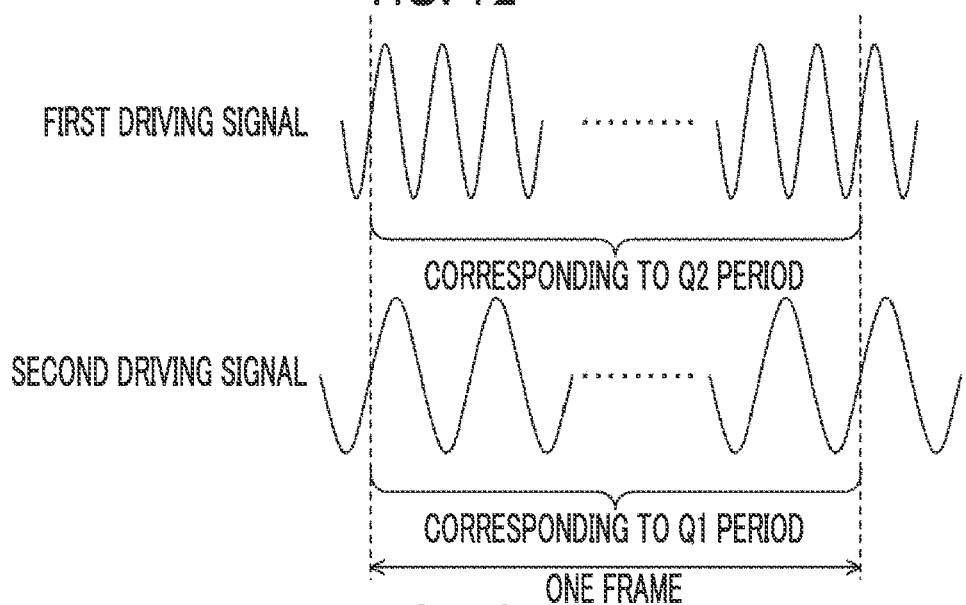
FIG. 12 is a diagram for describing one frame.

That is, as shown in FIG. 12, a period of time corresponding to a Q2 period of the first driving signal having the first driving frequency $f_{d1}$ is equal to a period of time corresponding to a Q1 period of the second driving signal having the second driving frequency $f_{d2}$. In the present embodiment, this period of time is set as the period of time of one frame.

The first derivation portion 63A derives a first integrated value by integrating the first phase delay time of the first angle detection signal S1c with respect to the first driving signal, the number of times that is n times the number of times corresponding to the period of time of one frame of the motion image to be drawn. Here, n is a natural number and is set as n=1 in the present embodiment. Alternatively, n may be greater than or equal to 2.

Figure 13:
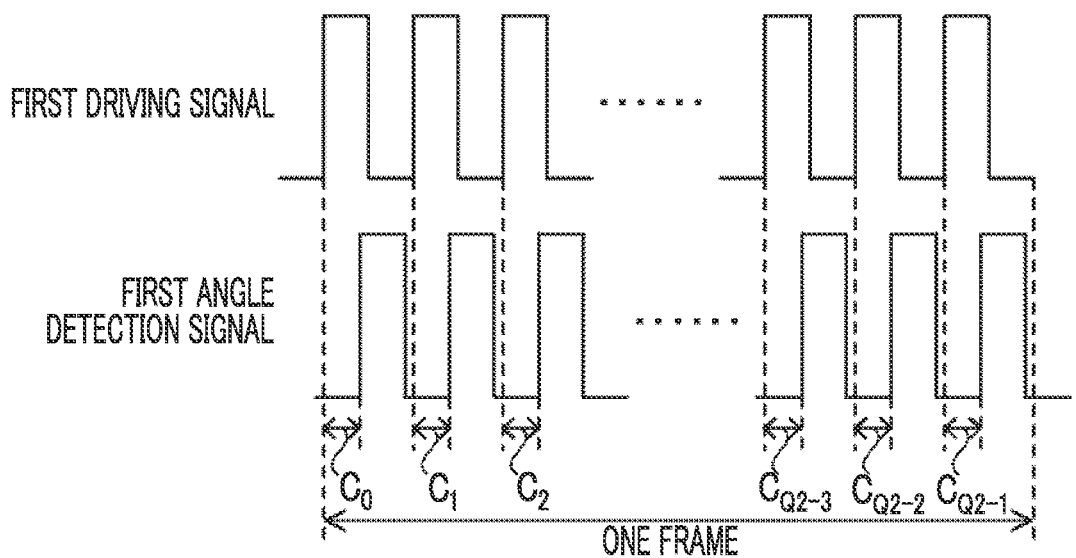
FIG. 13 is a diagram for describing derivation processing of a first integrated value.

Specifically, as shown in FIG. 13, the first derivation portion 63A binarizes the first driving signal and the first angle detection signal S1c. For example, the first derivation portion 63A binarizes the first driving signal and the first angle detection signal S1c by setting a value greater than or equal to an average value of a minimum value and a maximum value to 1 and by setting a value less than the average value to 0 for each of the first driving signal and the first angle detection signal S1c.

The first derivation portion 63A derives the first integrated value by consecutively integrating the first phase delay time of the first angle detection signal S1c with respect to the first driving signal after binarization, the number of times corresponding to the period of time of one frame of the motion image to be drawn. The number of times of integration in this case is Q2 described above. In addition, in the example in FIG. 13, the first phase delay time of a corresponding period is represented by $C_i$ (i is an integer of 0 to Q2−1). In addition, while a difference in timing of a rising edge between the first driving signal and the first angle detection signal S1c after binarization is used in the example in FIG. 13, a difference in timing of a falling edge between the first driving signal and the first angle detection signal S1c after binarization may also be used.

Next, the first derivation portion 63A derives a first average phase delay time that is an average value of the first phase delay time, by dividing the first integrated value by the number of times of integration.

The second derivation portion 63B derives a second integrated value by integrating the second phase delay time of the second angle detection signal S2c with respect to the second driving signal, the number of times that is n times the number of times corresponding to the period of time of one frame of the motion image to be drawn.

Figure 14:
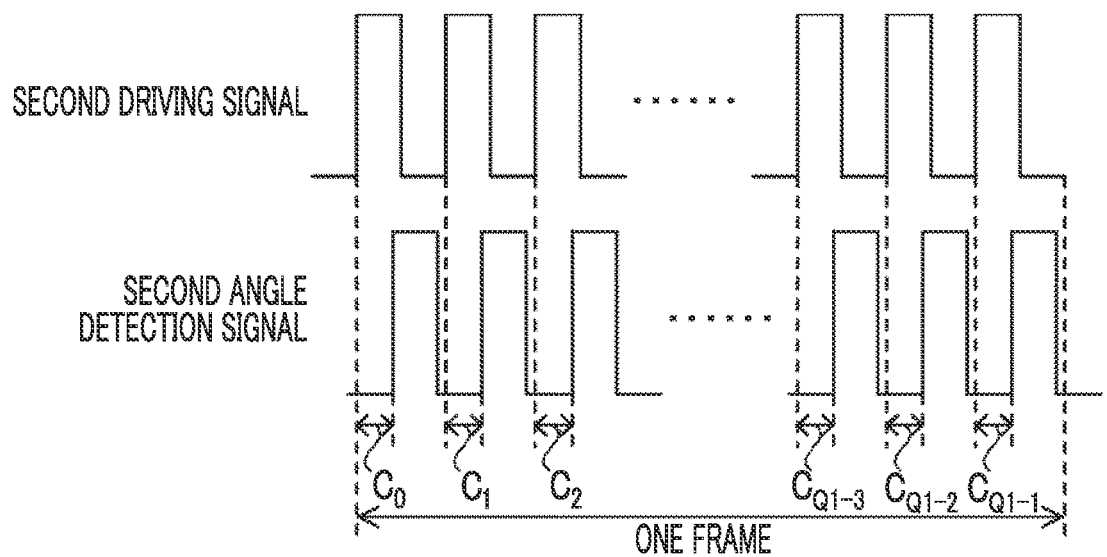
FIG. 14 is a diagram for describing derivation processing of a second integrated value.

Specifically, as shown in FIG. 14, the second derivation portion 63B binarizes the second driving signal and the second angle detection signal S2c. For example, the second derivation portion 63B binarizes the second driving signal and the second angle detection signal S2c by setting a value greater than or equal to an average value of a minimum value and a maximum value to 1 and by setting a value less than the average value to 0 for each of the second driving signal and the second angle detection signal S2c.

The second derivation portion 63B derives the second integrated value by consecutively integrating the second phase delay time of the second angle detection signal S2c with respect to the second driving signal after binarization, the number of times corresponding to the period of time of one frame of the motion image to be drawn. The number of times of integration in this case is Q1 described above. In addition, in the example in FIG. 14, the second phase delay time of a corresponding period is represented by $C_j$ (j is an integer of 0 to Q1−1). In addition, while a difference in timing of a rising edge between the second driving signal and the second angle detection signal S2c after binarization is used in the example in FIG. 14, a difference in timing of a falling edge between the second driving signal and the second angle detection signal S2c after binarization may also be used.

Next, the second derivation portion 63B derives a second average phase delay time that is an average value of the second phase delay time, by dividing the second integrated value by the number of times of integration.

The first zero cross pulse output portion 65A generates a reference signal (hereinafter, referred to as a "first reference signal") based on the first driving signal and on the first average phase delay time derived by the first derivation portion 63A. The first reference signal is a signal representing that the angle of the mirror portion 20 around the first axis $a_1$ is equal to a reference angle (hereinafter, referred to as a "first reference angle"). In the present embodiment, an example of applying zero as the first reference angle will be described. That is, the first zero cross pulse output portion 65A generates a zero cross pulse (hereinafter, referred to as a "first zero cross pulse") ZC1 as an example of the first reference signal based on the first driving signal and the first average phase delay time derived by the first derivation portion 63A. The first zero cross pulse output portion 65A is configured with a zero cross detection circuit. The first zero cross pulse is a zero cross signal representing that the angle of the mirror portion 20 around the first axis $a_1$ is zero.

Figure 15:
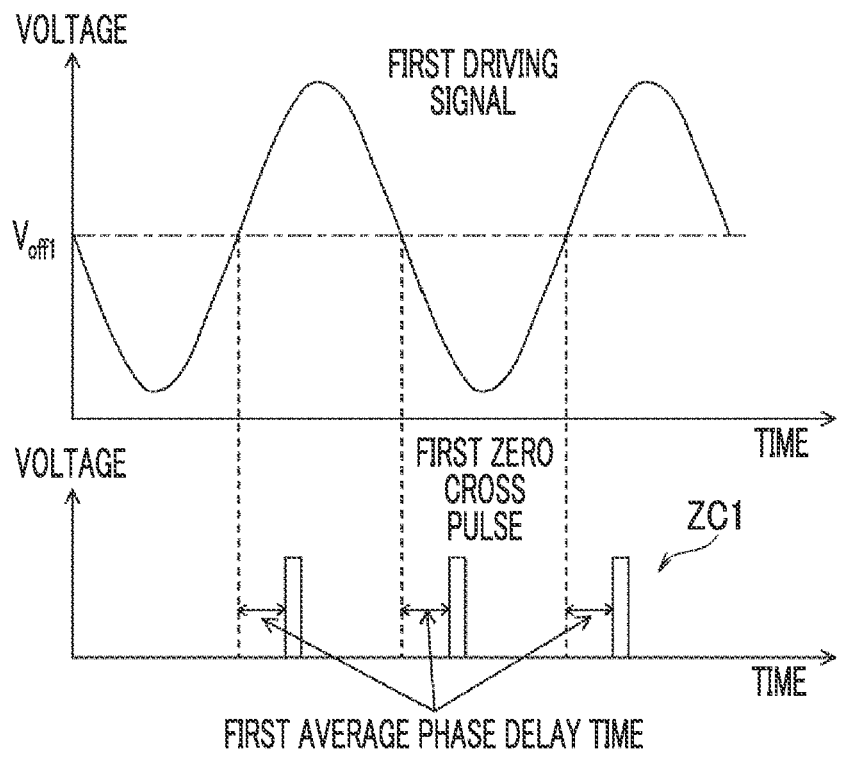
FIG. 15 is a diagram for describing generation processing of a first zero cross pulse.

As shown in FIG. 15, the first zero cross pulse output portion 65A generates the first zero cross pulse ZC1 at a point in time when the first average phase delay time elapses from a point in time when the first driving signal represents that the angle of the mirror portion 20 around the first axis $a_1$ is equal to the first reference angle (in the present embodiment, a point in time at which $V_{off1}$ is crossed). The first zero cross pulse output portion 65A outputs the generated first zero cross pulse ZC1 to the light source driving portion 66.

The second zero cross pulse output portion 65B generates a reference signal (hereinafter, referred to as a "second reference signal") based on the second driving signal and on the second average phase delay time derived by the second derivation portion 63B. The second reference signal is a signal representing that the angle of the mirror portion 20 around the second axis $a_2$ is equal to a reference angle (hereinafter, referred to as a "second reference angle"). In the present embodiment, an example of applying zero as the second reference angle will be described. That is, the second zero cross pulse output portion 65B generates a zero cross pulse (hereinafter, referred to as a "second zero cross pulse") ZC2 as an example of the second reference signal based on the second driving signal and the second average phase delay time derived by the second derivation portion 63B. The second zero cross pulse output portion 65B is configured with a zero cross detection circuit. The second zero cross pulse is a zero cross signal representing that the angle of the mirror portion 20 around the second axis $a_2$ is zero.

As shown in FIG. 16, the second zero cross pulse output portion 65B generates the second zero cross pulse ZC2 at a point in time when the second average phase delay time elapses from a point in time when the second driving signal represents that the angle of the mirror portion 20 around the second axis $a_2$ is equal to the second reference angle (in the present embodiment, a point in time at which $V_{off2}$ is crossed). The second zero cross pulse output portion 65B outputs the generated second zero cross pulse ZC2 to the light source driving portion 66.

While the first zero cross pulse output portion 65A and the second zero cross pulse output portion 65B output the zero cross pulses using both of the point in time when the sinusoidal wave becomes zero from a negative value toward a positive value and the point in time when the sinusoidal wave becomes zero from a positive value toward a negative value, the present disclosure is not limited thereto. For example, the first zero cross pulse output portion 65A and the second zero cross pulse output portion 65B may output the zero cross pulses using any one of the point in time when the sinusoidal wave becomes zero from a negative value toward a positive value or the point in time when the sinusoidal wave becomes zero from a positive value toward a negative value.

The light source driving portion 66 drives the light source 3 based on, for example, drawing data supplied from an outside of the image drawing system 10. In addition, the light source driving portion 66 controls an irradiation timing of the laser light by the light source 3 so that the irradiation timing is synchronized with the first zero cross pulse ZC1 and with the second zero cross pulse ZC2.

Next, a flow of first average phase delay time derivation processing will be described with reference to FIG. 17. For example, the first average phase delay time derivation processing is executed at a predetermined time interval during the drawing of the image performed by the image drawing system 10. For example, the time interval may be a time interval corresponding to the period of time of one frame or may be a time interval corresponding to a period of time of a plurality of frames.

In step S10 in FIG. 17, the first derivation portion 63A binarizes the first driving signal and the first angle detection signal S1c as described above. In step S12, the first derivation portion 63A derives the first integrated value by consecutively integrating the first phase delay time of the first angle detection signal S1c with respect to the first driving signal after binarization performed by the processing in step S10, the number of times corresponding to the period of time of one frame of the motion image to be drawn.

In step S14, the first derivation portion 63A derives the first average phase delay time that is the average value of the first phase delay time, by dividing the first integrated value derived in step S12 by the number of times of integration. In a case where the processing in step S14 ends, the first average phase delay time derivation processing ends. The first average phase delay time is updated by periodically executing the first average phase delay time derivation processing during the drawing of the image.

Next, a flow of second average phase delay time derivation processing will be described with reference to FIG. 18. For example, the second average phase delay time derivation processing is executed at a predetermined time interval during the drawing of the image performed by the image drawing system 10. For example, the time interval may be a time interval corresponding to the period of time of one frame or may be a time interval corresponding to a period of time of a plurality of frames. In addition, the second average phase delay time derivation processing may be executed at the same time as the first average phase delay time derivation processing.

In step S20 in FIG. 18, the second derivation portion 63B binarizes the second driving signal and the second angle detection signal S2c as described above. In step S22, the second derivation portion 63B derives the second integrated value by consecutively integrating the second phase delay time of the second angle detection signal S2c with respect to the second driving signal after binarization performed by the processing in step S20, the number of times corresponding to the period of time of one frame of the motion image to be drawn.

In step S24, the second derivation portion 63B derives the second average phase delay time that is the average value of the second phase delay time, by dividing the second integrated value derived in step S22 by the number of times of integration as described above. In a case where the processing in step S24 ends, the second average phase delay time derivation processing ends. The second average phase delay time is updated by periodically executing the second average phase delay time derivation processing during the drawing of the image.

Next, a flow of first zero cross pulse generation processing will be described. For example, the first zero cross pulse generation processing is executed during the drawing of the image performed by the image drawing system 10.

The first zero cross pulse output portion 65A generates a binarized signal of the first driving signal generated by the first driving signal generation portion 60A. A method for binarization may be a method of using a comparator or may be a method of providing a register of 1 bit in a field programmable gate array (FPGA). The first zero cross pulse output portion 65A outputs a binarization signal obtained by delaying the binarized signal by the first average phase delay time, to the light source driving portion 66 as the first zero cross pulse ZC1, and the first zero cross pulse generation processing ends.

Next, a flow of second zero cross pulse generation processing will be described. For example, the second zero cross pulse generation processing is executed during the drawing of the image performed by the image drawing system 10.

The second zero cross pulse output portion 65B generates a binarized signal of the second driving signal generated by the second driving signal generation portion 60B. A method for binarization may be a method of using a comparator or a method of providing a register of 1 bit in an FPGA. The second zero cross pulse output portion 65B outputs a binarization signal obtained by delaying the binarized signal by the second average phase delay time, to the light source driving portion 66 as the second zero cross pulse ZC2, and the second zero cross pulse generation processing ends.

Figure 19:
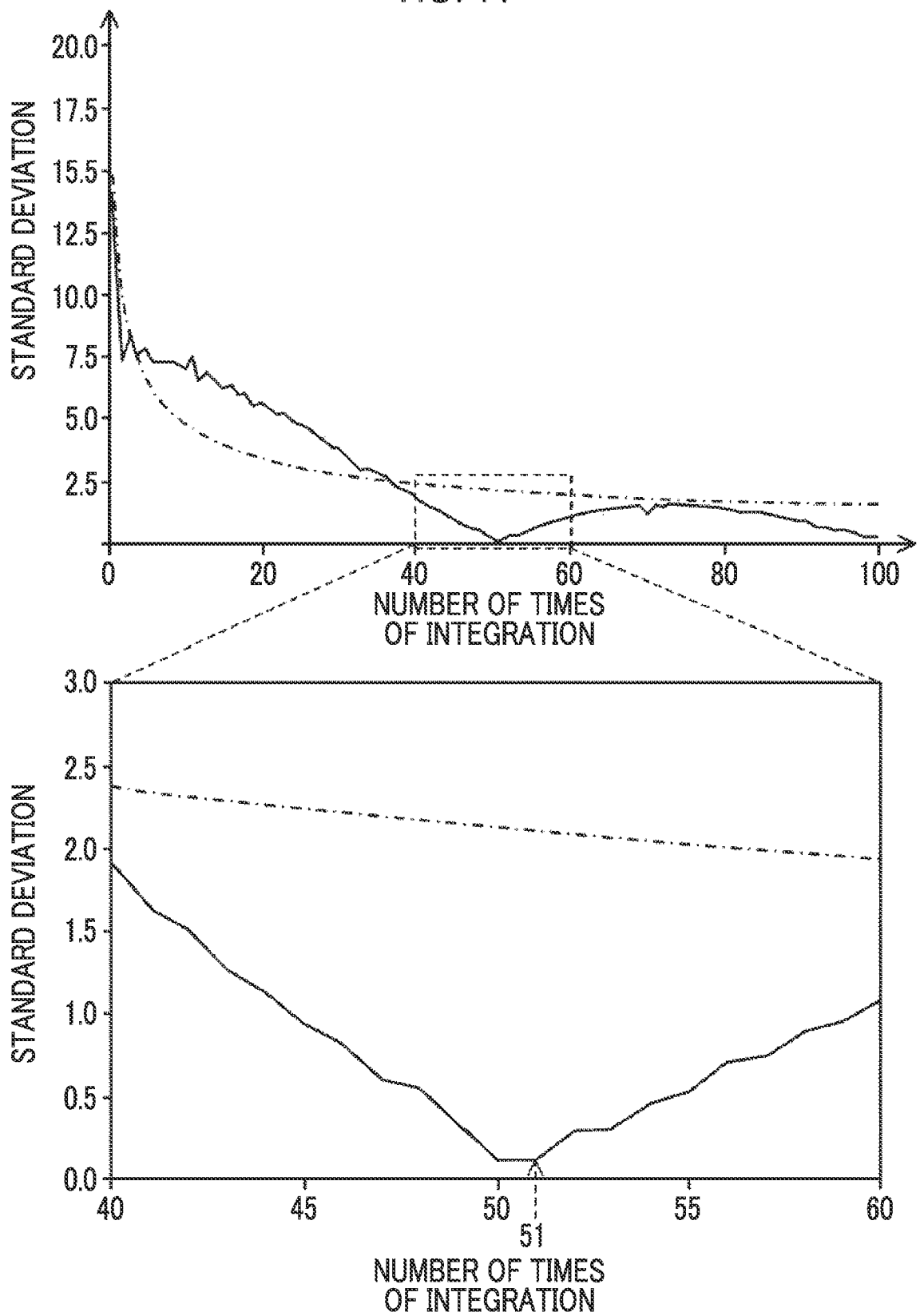
FIG. 19 is a graph showing an example of a relationship between a standard deviation of the first integrated value and the number of times of integration.
Figure 20:
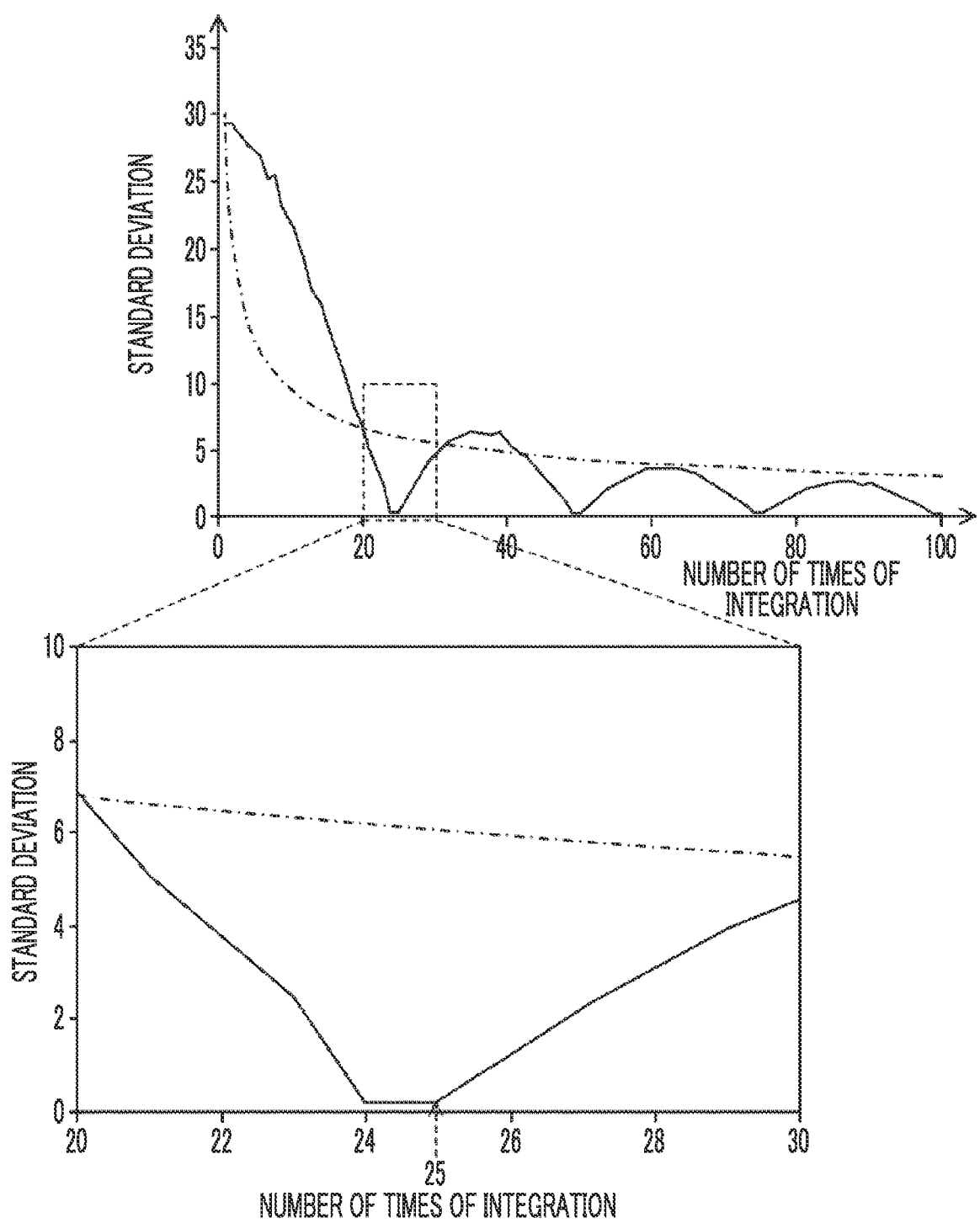
FIG. 20 is a graph showing an example of a relationship between a standard deviation of the second integrated value and the number of times of integration.

FIG. 19 illustrates an example of a relationship between a standard deviation of the first integrated value derived a constant number of times (for example, 1000 times) and the number of times of integration. FIG. 20 illustrates an example of a relationship between a standard deviation of the second integrated value derived the constant number of times and the number of times of integration. In addition, it is represented that as the standard deviation of the first integrated value is decreased, that is, as variations in the first integrated value are decreased, the effect of the swing of the mirror portion 20 around the second axis $a_2$ can be removed more from the first angle detection signal S1c. It is represented that as the standard deviation of the second integrated value is decreased, that is, as variations in the second integrated value are decreased, the effect of the swing of the mirror portion 20 around the first axis $a_1$ can be removed more from the second angle detection signal S2c.

An upper part of FIG. 19 shows the standard deviation of the first integrated value in a case where processing of deriving the first integrated value while changing the number of times of integration from 1 to 100 is performed the constant number of times. A lower part of FIG. 19 is an enlarged part (a part surrounded by a rectangle of a broken line) in which the number of times of integration is 40 to 60 in the upper part of FIG. 19. In addition, a solid line in FIG. 19 represents the standard deviation of the first integrated value in a case where the first phase delay time is consecutively integrated as in the embodiment. A dot dashed line in FIG. 19 represents the standard deviation of the first integrated value in a case where the first phase delay time is randomly selected and integrated as a comparative example.

An upper part of FIG. 20 shows the standard deviation of the second integrated value in a case where processing of deriving the second integrated value while changing the number of times of integration from 1 to 100 is performed the constant number of times. A lower part of FIG. 20 is an enlarged part (a part surrounded by a rectangle of a broken line) in which the number of times of integration is 20 to 30 in the upper part of FIG. 20. In addition, a solid line in FIG. 20 represents the standard deviation of the second integrated value in a case where the second phase delay time is consecutively integrated as in the embodiment. A dot dashed line in FIG. 20 represents the standard deviation of the second integrated value in a case where the second phase delay time is randomly selected and integrated as a comparative example.

In addition, FIG. 19 and FIG. 20 show results in a case where the first phase delay time and the second phase delay time are represented by the number of clocks of a system clock. In addition, FIG. 19 and FIG. 20 show results in a case where the optical scanning device 2 is driven by setting Q1 to 25 and by setting Q2 to 51.

As shown by the dot dashed line in FIG. 19, in the comparative example, while the standard deviation of the first integrated value is decreased as the number of times of integration is increased, a degree of decrease in the standard deviation of the first integrated value is decreased in a case where the number of times of integration becomes greater than or equal to a certain number. That is, in the comparative example, the number of times of integration is to be increased in order to decrease the standard deviation of the first integrated value.

As shown by the solid line in FIG. 19, even in a case where the first phase delay time is consecutively integrated, the standard deviation of the first integrated value tends to be decreased as the number of times of integration is increased. However, the standard deviation of the first integrated value is the smallest in a case where the number of times of integration is Q2 (here, 51). As described above, a case where the number of times of integration is Q2 is a case where the number of times of integration is the number of times corresponding to the period of time of one frame of the motion image to be drawn.

As shown by the dot dashed line in FIG. 20, in the comparative example, while the standard deviation of the second integrated value is decreased as the number of times of integration is increased, a degree of decrease in the standard deviation of the second integrated value is decreased in a case where the number of times of integration becomes greater than or equal to a certain number. That is, in the comparative example, the number of times of integration is to be increased in order to decrease the standard deviation of the second integrated value.

As shown by the solid line in FIG. 20, even in a case where the second phase delay time is consecutively integrated, the standard deviation of the second integrated value tends to be decreased as the number of times of integration is increased. However, the standard deviation of the second integrated value is the smallest in a case where the number of times of integration is Q1 (here, 25). As described above, a case where the number of times of integration is Q1 is a case where the number of times of integration is the number of times corresponding to the period of time of one frame of the motion image to be drawn. In addition, in this case, the standard deviation of the second integrated value is also the smallest in a case where the number of times of integration is twice (here, 50), three times (here, 75), and four times (here, 100) greater than Q1.

As described above, according to the present embodiment, the first integrated value is derived by integrating the first phase delay time the number of times corresponding to the period of time of one frame of the motion image to be drawn. The first integrated value is obtained by reducing the effect of the swing of the mirror portion 20 around the second axis $a_2$ from the first angle detection signal S1c. In addition, according to the present embodiment, the second integrated value is derived by integrating the second phase delay time the number of times corresponding to the period of time of one frame of the motion image to be drawn. The second integrated value is obtained by reducing the effect of the swing of the mirror portion 20 around the first axis $a_1$ from the second angle detection signal S2c.

Accordingly, by using the first integrated value and the second integrated value derived in such a manner, a decrease in detection accuracy of the angle of the mirror portion 20 around the first axis $a_1$ and of the angle of the mirror portion 20 around the second axis $a_2$ can be suppressed. In addition, the number of times of integration in deriving the first integrated value and the second integrated value can be a small number.

While a case where the first derivation portion 63A derives the first integrated value by integrating the first phase delay time of the first angle detection signal S1c with respect to the first driving signal is described in the embodiment, the present disclosure is not limited thereto. For example, the first derivation portion 63A may derive the first integrated value by integrating the first phase delay time of the first angle detection signal S1c with respect to the first signal to be referred to that is a signal for reference corresponding to the first driving signal, such as a duplicated signal of the first driving signal.

In addition, while a case where the second derivation portion 63B derives the second integrated value by integrating the second phase delay time of the second angle detection signal S2c with respect to the second driving signal is described in the embodiment, the present disclosure is not limited thereto. For example, the second derivation portion 63B may derive the second integrated value by integrating the second phase delay time of the second angle detection signal S2c with respect to the second signal to be referred to that is a signal for reference corresponding to the second driving signal, such as a duplicated signal of the second driving signal.

In addition, the configuration of the MMD 4 shown in the embodiment is an example. The configuration of the MMD 4 can be variously modified. For example, the first actuators 31 that cause the mirror portion 20 to swing around the first axis $a_1$ may be arranged in the second movable frame 24, and the second actuators 32 that cause the mirror portion 20 to swing around the second axis $a_2$ may be arranged in the first movable frame 22.

Figure 21:
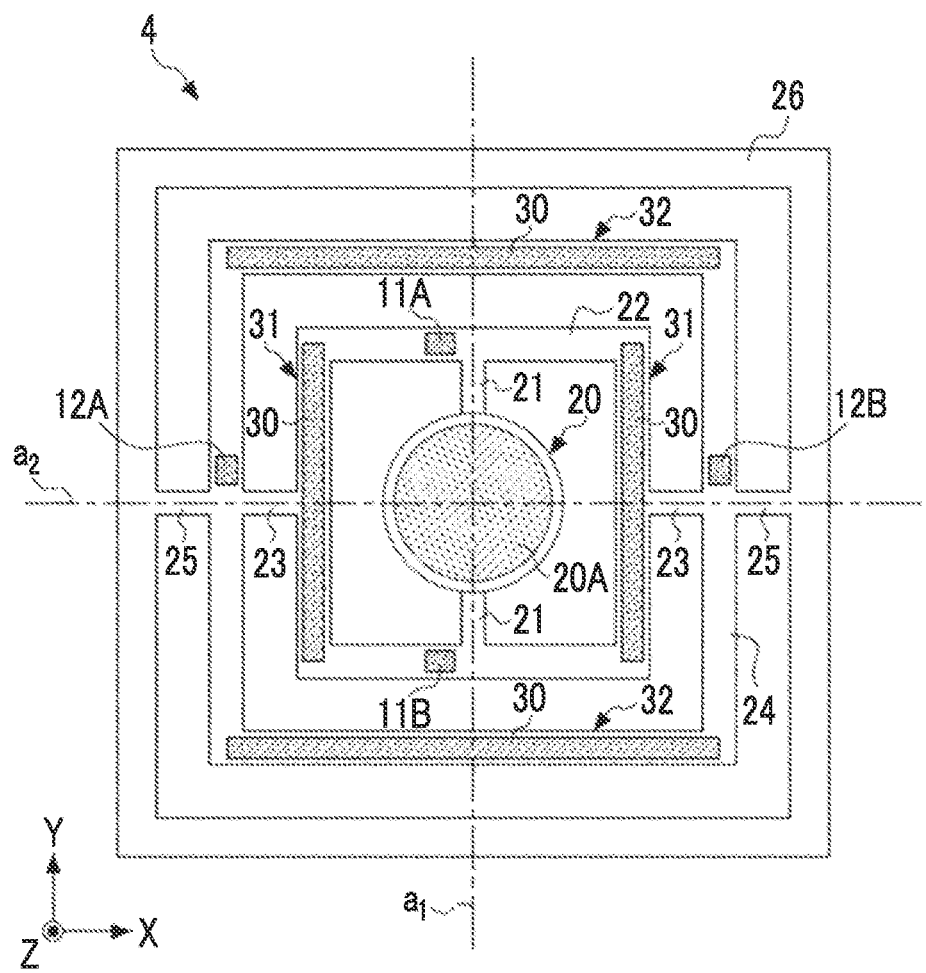
FIG. 21 is a plan view of a micromirror device according to a modification example.

In addition, in the embodiment, while a case where the pair of first angle detection sensors 11A and 11B are arranged at positions that face each other with the first axis $a_1$ interposed therebetween is described, the present disclosure is not limited thereto. For example, as shown in FIG. 21, the pair of first angle detection sensors 11A and 11B may be arranged at positions that face each other with the second axis $a_2$ interposed therebetween. In the example in FIG. 21, each of the pair of first angle detection sensors 11A and 11B is arranged near the first support portions 21 on the first movable frame 22. The first angle detection sensor 11A is arranged near the first support portion 21 connected to one side of the mirror portion 20. The first angle detection sensor 11B is arranged near the first support portion 21 connected to the other side of the mirror portion 20. Accordingly, the pair of first angle detection sensors 11A and 11B are arranged at positions that face each other with the second axis $a_2$ interposed therebetween and that face each other with the mirror portion 20 interposed therebetween. In addition, the pair of first angle detection sensors 11A and 11B are arranged at positions that are shifted in the same direction (in the example in FIG. 21, the −X direction) from the first axis $a_1$.

As in the embodiment, in a case where the pair of first angle detection sensors 11A and 11B are arranged at positions that face each other with the first axis $a_1$ interposed therebetween, the vibration noise can be removed by subtracting one of the output signals of both of the first angle detection sensors 11A and 11B from the other. On the other hand, as in this form example, in a case where the pair of first angle detection sensors 11A and 11B are arranged at positions that face each other with the second axis $a_2$ interposed therebetween, the vibration noise can be removed by adding the output signals of both of the first angle detection sensors 11A and 11B.

Figure 22:
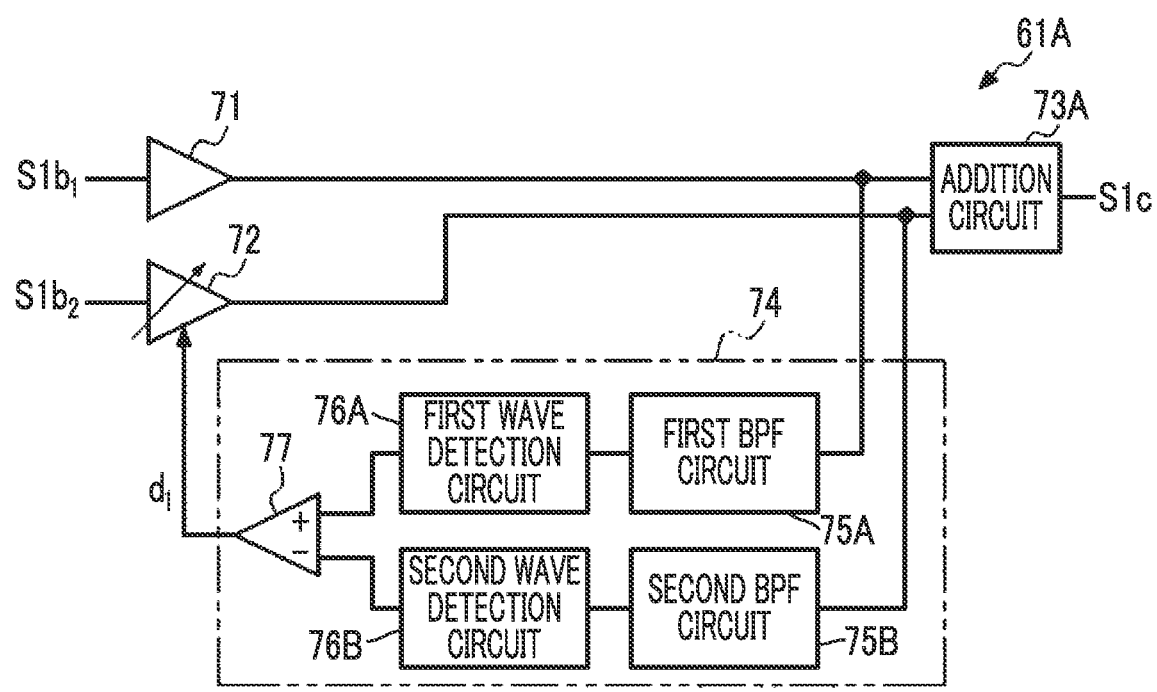
FIG. 22 is a circuit diagram showing a configuration of a first signal processing portion according to the modification example.

An example of a configuration of the first signal processing portion 61A in this form example is shown in FIG. 22. As shown in FIG. 22, in this form example, the first signal processing portion 61A includes an addition circuit 73A instead of the subtraction circuit 73. The addition circuit 73A outputs a value obtained by adding the signal $S1b_1$ input from the first angle detection sensor 11A through the buffer amplifier 71 to the signal $S1b_2$ input from the first angle detection sensor 11B through the variable gain amplifier 72.

In addition, in the embodiment, while a case where the pair of second angle detection sensors 12A and 12B are arranged at positions that face each other with the second axis $a_2$ interposed therebetween is described, the present disclosure is not limited thereto. For example, as shown in FIG. 21, the pair of second angle detection sensors 12A and 12B may be arranged at positions that face each other with the first axis $a_1$ interposed therebetween. In the example in FIG. 21, each of the pair of second angle detection sensors 12A and 12B is arranged near the second support portions 23 on the second movable frame 24. The second angle detection sensor 12A is arranged near the second support portion 23 connected to one side of the first movable frame 22. The second angle detection sensor 12B is arranged near the second support portion 23 connected to the other side of the first movable frame 22. Accordingly, the pair of second angle detection sensors 12A and 12B are arranged at positions that face each other with the first axis $a_1$ interposed therebetween and that face each other with the mirror portion 20 and the first movable frame 22 interposed therebetween. In addition, the pair of second angle detection sensors 12A and 12B are arranged at positions that are shifted in the same direction (in the example in FIG. 21, the +Y direction) from the second axis $a_2$.

As in the embodiment, in a case where the pair of second angle detection sensors 12A and 12B are arranged at positions that face each other with the second axis $a_2$ interposed therebetween, the vibration noise can be removed by subtracting one of the output signals of both of the second angle detection sensors 12A and 12B from the other. On the other hand, as in this form example, in a case where the pair of second angle detection sensors 12A and 12B are arranged at positions that face each other with the first axis $a_1$ interposed therebetween, the vibration noise can be removed by adding the output signals of both of the second angle detection sensors 12A and 12B. A configuration of the second signal processing portion 61B in this form example can be implemented by the same configuration as the first signal processing portion 61A shown in FIG. 22 and thus, will not be described.

In addition, in the embodiment, a form of providing any one of the pair of first angle detection sensors 11A and 11B in the MMD 4 may be applied. Similarly, a form of providing any one of the pair of second angle detection sensors 12A and 12B in the MMD 4 may be applied.

In addition, a hardware configuration of the driving controller 5 can be variously modified. The driving controller 5 can be configured using at least one of an analog operation circuit or a digital operation circuit. The driving controller 5 may be configured with one processor or may be configured with a combination of two or more processors of the same type or different types. Examples of the processor include a central processing unit (CPU), a programmable logic device (PLD), and a dedicated electric circuit. As is well known, the CPU is a general-purpose processor that executes software (program) to function as various processing portions. The PLD is a processor such as an FPGA that has a circuit configuration changeable after manufacture. The dedicated electric circuit is a processor such as an application specific integrated circuit (ASIC) that has a circuit configuration dedicatedly designed to perform specific processing.

What is claimed is:

1. An optical scanning device comprising:
   a mirror portion that has a reflecting surface on which an incidence ray is reflected;
   a first actuator that causes the mirror portion to swing around a first axis which is in a plane including the reflecting surface at a time of a standstill of the mirror portion;
   a second actuator that causes the mirror portion to swing around a second axis which is in the plane including the reflecting surface at the time of the standstill of the mirror portion and which intersects with the first axis;
   a first angle detection sensor that outputs a signal corresponding to an angle of the mirror portion around the first axis;
   a second angle detection sensor that outputs a signal corresponding to an angle of the mirror portion around the second axis; and
   at least one processor,
   wherein the processor is configured to:
   provide a first driving signal having a first driving frequency to the first actuator;
   provide a second driving signal having a second driving frequency to the second actuator;
   derive a first integrated value by integrating a first phase delay time of the output signal of the first angle detection sensor with respect to a first signal to be referred to corresponding to the first driving signal, the number of times that is greater by a factor of a natural number than the number of times corresponding to a period of time of one frame of a motion image to be drawn; and derive a second integrated value by integrating a second phase delay time of the output signal of the second angle detection sensor with respect to a second signal to be referred to corresponding to the second driving signal, the number of times that is greater by a factor of a natural number than the number of times corresponding to the period of time of one frame.

2. The optical scanning device according to claim 1, wherein the first signal to be referred to is the first driving signal, and
the second signal to be referred to is the second driving signal.

3. The optical scanning device according to claim 2, wherein the processor is configured to:
derive the first integrated value after binarizing the first driving signal and the output signal of the first angle detection sensor; and
derive the second integrated value after binarizing the second driving signal and the output signal of the second angle detection sensor.

4. The optical scanning device according to claim 1, wherein the processor is configured to:
derive a first average phase delay time that is an average value of the first phase delay time, by dividing the first integrated value by the number of times of integration;
derive a second average phase delay time that is an average value of the second phase delay time, by dividing the second integrated value by the number of times of integration;
output a first reference signal representing that the angle of the mirror portion around the first axis is equal to a first reference angle, at a point in time when the first average phase delay time elapses from a point in time when the first driving signal represents that the angle of the mirror portion around the first axis is equal to the first reference angle; and
output a second reference signal representing that the angle of the mirror portion around the second axis is equal to a second reference angle, at a point in time when the second average phase delay time elapses from a point in time when the second driving signal represents that the angle of the mirror portion around the second axis is equal to the second reference angle.

5. The optical scanning device according to claim 4, wherein the first reference angle and the second reference angle are zero.

6. A driving method of an optical scanning device including a mirror portion that has a reflecting surface on which an incidence ray is reflected, a first actuator that causes the mirror portion to swing around a first axis which is in a plane including the reflecting surface at a time of a standstill of the mirror portion, a second actuator that causes the mirror portion to swing around a second axis which is in the plane including the reflecting surface at the time of the standstill of the mirror portion and which intersects with the first axis, a first angle detection sensor that outputs a signal corresponding to an angle of the mirror portion around the first axis, and a second angle detection sensor that outputs a signal corresponding to an angle of the mirror portion around the second axis, the driving method comprising:
providing a first driving signal having a first driving frequency to the first actuator;
providing a second driving signal having a second driving frequency to the second actuator;
deriving a first integrated value by integrating a first phase delay time of the output signal of the first angle detection sensor with respect to a first signal to be referred to corresponding to the first driving signal, the number of times that is greater by a factor of a natural number than the number of times corresponding to a period of time of one frame of a motion image to be drawn; and
deriving a second integrated value by integrating a second phase delay time of the output signal of the second angle detection sensor with respect to a second signal to be referred to corresponding to the second driving signal, the number of times that is greater by a factor of a natural number than the number of times corresponding to the period of time of one frame.

7. An image drawing system comprising:
the optical scanning device according to claim 1; and
a light source that irradiates the mirror portion with light.

* * * * *